(12) United States Patent
Dai et al.

(10) Patent No.: US 11,888,614 B2
(45) Date of Patent: Jan. 30, 2024

(54) POLAR CODE SEGMENT ENCODING METHOD AND COMMUNICATION DEVICE

(71) Applicant: Huawei Technologies Co., Ltd., Shenzhen (CN)

(72) Inventors: Shengchen Dai, Hangzhou (CN); Jiajie Tong, Hangzhou (CN); Zhan Yu, Singapore (SG); Kai Fu, Singapore (SG); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 17/704,869

(22) Filed: Mar. 25, 2022

(65) Prior Publication Data
US 2022/0224441 A1   Jul. 14, 2022

Related U.S. Application Data

(63) Continuation of application No. PCT/CN2020/113950, filed on Sep. 8, 2020.

(30) Foreign Application Priority Data

Sep. 27, 2019   (CN) .......................... 201910927225.4

(51) Int. Cl.
*H04L 1/00* (2006.01)

(52) U.S. Cl.
CPC .......... *H04L 1/0057* (2013.01); *H04L 1/0007* (2013.01); *H04L 1/0041* (2013.01)

(58) Field of Classification Search
USPC ....................................................... 375/295
See application file for complete search history.

(56) References Cited

U.S. PATENT DOCUMENTS

| 6,557,137 B1 | 4/2003 | Park et al. |
| 2016/0163087 A1 | 6/2016 | Cho et al. |

(Continued)

FOREIGN PATENT DOCUMENTS

| CN | 105227189 A | 1/2016 |
| CN | 106788456 A | 5/2017 |

(Continued)

OTHER PUBLICATIONS

Q. Yu, et al., "On the Concatenations of Polar Codes and Non-Binary LDPC Codes," in IEEE Access, vol. 6, 2018, 10 pages.

(Continued)

*Primary Examiner* — Leila Malek
(74) *Attorney, Agent, or Firm* — Conley Rose, P.C.

(57) ABSTRACT

A method includes determining, based on a length of to-be-encoded information bits and a code rate, a code length N after encoding; determining, based on N, a minimum segment code length and a maximum segment code length, a reserved segment quantity of each type of segments in segments of b−a+1 types of segment code lengths and a reserved code length corresponding to N, where the minimum segment code length is $2^a$, and the maximum segment code length is $2^b$; determining a segment quantity of each type of segments based on N, the reserved code length, a segment code length of each type of segments, and the reserved segment quantity, where N corresponds to S segments, and a segment code length of an $i^{th}$ segment in the S segments is greater than or equal to a segment code length of an $(i+1)^{th}$ segment in the S segments.

20 Claims, 9 Drawing Sheets

(56) References Cited

U.S. PATENT DOCUMENTS

| | | | |
|---|---|---|---|
| 2019/0149268 A1 | 5/2019 | Xu et al. | |
| 2019/0349128 A1 | 11/2019 | Zhou et al. | |
| 2020/0021392 A1 | 1/2020 | Xu et al. | |
| 2020/0235847 A1 | 7/2020 | Wang et al. | |
| 2021/0288663 A1* | 9/2021 | Wu | H03M 13/09 |

FOREIGN PATENT DOCUMENTS

| | | |
|---|---|---|
| CN | 106888026 A | 6/2017 |
| CN | 107517095 A | 12/2017 |
| CN | 108347301 A | 7/2018 |
| CN | 108365921 A | 8/2018 |
| CN | 108631930 A | 10/2018 |
| CN | 109600201 A | 4/2019 |
| CN | 110166167 A | 8/2019 |
| WO | 2018146552 A1 | 8/2018 |
| WO | 2018171790 A1 | 9/2018 |
| WO | 2019095270 A1 | 5/2019 |

OTHER PUBLICATIONS

Huawei, "Design aspects of Polar Code and LDPC for NR," 3GPP TSG RAN WG1 Meeting #86bis Lisbon, Portugal, Oct. 10-14, 2016, R1-1608865, 7 pages.

CATT, "Design of polar codes for eMBB control channel," 3GPP TSG RAN WG1 Meeting #88, R1-1702110, Athens, Greece, Feb. 13-17, 2017, 4 pages.

ZTE, "Further Consideration on Polar codes with maximum mother code," 3GPP TSG RAN WG1 Meeting #89, R1-1707182, Hangzhou, China, May 15-19, 2017, 13 pages.

ZTE, "Rate Matching Scheme of Polar Codes," 3GPP TSG RAN WG1 NR Ad-Hoc#2, R1-1710848, Qingdao, China, Jun. 27-30, 2017, 17 pages.

Shen Zhouqing et al, "Research on multi-bit decoding algorithms for polar codes," Telecommunications Science, 2018, 10 pages.

Huawei, et al., "Segmentation for Polar codes [online]," 3GPP TSG RAN WG1 #90b, R1-1718372, Oct. 9-13, 2017, 6 pages.

* cited by examiner

S501: Determine, based on a length of to-be-encoded information bits and a code rate, a code length $N$ after encoding, where $N$ is a positive integer S502: Determine, based on $N$, a minimum segment code length, and a maximum segment code length, a reserved segment quantity of each type of segments in segments of $b-a+1$ types of segment code lengths and a corresponding reserved code length, where a value of the minimum segment code length is $2^{\wedge a}$, a value of the maximum segment code length is $2^{\wedge b}$, the $b-a+1$ types of segment code lengths of the segments are $2^{\wedge c}$, $a$, $b$, and $c$ are positive integers, and a≤c≤d S503: Orderly determine a segment quantity of each type of segments based on $N$, the reserved code length, a segment code length of each type of segments, and the reserved segment quantity of each type of segments and based on the segment code lengths from the largest to the smallest, where a sum of segment quantities of all types of segments is equal to S, $N$ corresponds to S segments, and a segment code length of an $i^{th}$ segment in the S segments is greater than or equal to a segment code length of an $(i+1)^{th}$ segment in the S segments S504: Determine a target information bit length of each segment based on the code rate and a segment code length of each segment in the S segments S505: Perform polar code encoding on the to-be-encoded information bits based on the target information bit length of each segment

FIG. 5

POLAR CODE SEGMENT ENCODING METHOD AND COMMUNICATION DEVICE

CROSS-REFERENCE TO RELATED APPLICATIONS

This is a continuation of International Patent Application No. PCT/CN2020/113950 filed on Sep. 8, 2020, which claims priority to Chinese Patent Application No. 201910927225.4 filed on Sep. 27, 2019. The disclosures of the aforementioned applications are hereby incorporated by reference in their entireties.

TECHNICAL FIELD

This disclosure relates to the field of electronic technologies, and in particular, to a polar code segment encoding method and a communication device.

BACKGROUND

For a communication system that is sensitive to a delay, after receiving data, a receive end device may be expected to complete processing of the data in a short time and reply with an acknowledgment character (ACK). For example, in a Bluetooth system, an interval between a time point at which a mobile phone completes sending data and a time point at which the mobile phone receives an ACK of a primary headset is 189 microseconds (s), and after the primary headset and a secondary headset receive complete information sent by the mobile phone, there may be a 15 μs time margin for decoding and data reporting. For a system that uses low power consumption, for example, a Bluetooth system, power of information reporting is usually limited. Consequently, a reporting rate of information bits is further limited. The Bluetooth system usually uses an encoding manner in which no channel code or convolutional code is used. When there is no code, a receive end may report received data while making a judgment, to meet a limit of completing decoding and data reporting in 15 μs. However, performance of the Bluetooth system is poor. When convolutional code is used, because a decoding algorithm of the convolutional code is a Viterbi decoding algorithm, the Viterbi decoding algorithm with traceback may also meet the limit of completing decoding and data reporting in 15 μs. However, the performance of the Bluetooth system can be further improved. For ease of description, in this disclosure, duration from a time point at which complete data sent by the mobile phone is received by the primary headset and/or the secondary headset to a time point at which the primary headset and/or the secondary headset continues to perform decoding and reporting is referred to as a delay of decoding and reporting, and the delay of decoding and reporting may be expected to meet a 15 μs margin limit.

In an existing encoding manner, performance of a low-power communication system may not be improved when a delay limit of decoding and reporting is met.

SUMMARY

Embodiments of this disclosure provide a polar code segment encoding method and a communication device, to improve performance of a low-power communication system when a delay limit of decoding and reporting is met.

According to a first aspect, this disclosure provides a polar code segment encoding method, including determining, based on a length of to-be-encoded information bits and a code rate, a code length N after encoding, where N is a positive integer, determining, based on N, a minimum segment code length and a maximum segment code length, a reserved segment quantity of each type of segments in segments of b−a+1 types of segment code lengths and a reserved code length corresponding to N, where a value of the minimum segment code length is $2^a$, a value of the maximum segment code length is $2^b$, the b−a+1 types of segment code lengths of the segments are $2^c$, a, b, and c are positive integers, a<b and a≤c≤b, orderly determining a segment quantity of each type of segments based on N, the reserved code length, a segment code length of each type of segments the reserved segment quantity of each type of segments and the segment code lengths from the largest to the smallest, where a sum of segment quantities of types of segments is equal to S, N corresponds to S segments and a segment code length of an $i^{th}$ segment in the S segments is greater than or equal to a segment code length of an $(i+1)^{th}$ segment in the S segments, determining a target information bit length of each segment based on the code rate and a segment code length of each segment in the S segments, and performing polar code encoding on the to-be-encoded information bits based on the target information bit length of each segment.

Through implementation of the method described in the first aspect, the segments of the b−a+1 types of segment code lengths are determined based on the minimum segment code length and the maximum segment code length, the value of the minimum segment code length is $2^a$ and the value of the maximum segment code length is $2^b$, where the code length N after encoding is divided into the S segments based on the minimum segment code length and the b−a+1 types of segment code lengths of the segments, the segment code length of the $i^{th}$ segment in the S segments is greater than or equal to the segment code length of the $(i+1)^{th}$ segment in the S segments and the to-be-encoded information bits are allocated to the S segments for polar code encoding. Segment code lengths of segments of a packet trailer of a data packet after segmentation are in a decreasing trend, so that performance of a low-power communication system can be improved when a low delay requirement is met.

In a possible implementation, the determining, based on a length of to-be-encoded information bits and a code rate, a code length N after encoding includes determining a theoretical code length L based on the length $K_0$ of the to-be-encoded information bits and the code rate R, where a value of the theoretical code length is ceil($K_0$/R) and ceil(x) represents rounding up x, and determining N N based on the theoretical code length and the minimum segment code length $2^a$, where a value of N is ceil(L/$2^a$)*$2^a$.

In a possible implementation, the determining, based on N, a minimum segment code length and a maximum segment code length, a reserved segment quantity of each type of segments in segments of b−a+1 types of segment code lengths and a reserved code length corresponding to N, where a value of the minimum segment code length is $2^a$, a value of the maximum segment code length is $2^b$, the b−a+1 types of segment code lengths of the segments are $2^c$, a, b, and c are positive integers, a<b and a≤c≤b includes determining the segments of the b−a+1 types of segment code lengths based on the minimum segment code length and the maximum segment code length, where the value of the minimum segment code length is $2^a$, the value of the maximum segment code length is $2^b$, the b−a+1 types of segment code lengths of the segments are $2^c$, a, b, and c are positive integers, a<b and a≤c≤b, orderly determining a reserved segment quantity of an $i^{th}$ type of segments in the b−a+1 types of segments based on the b−a+1 types of segment code lengths of the segments from the smallest to the largest and based on N and the segment code length of each type of segments in the b−a+1 types of segments, where the reserved segment quantity of the $i^{th}$ type of segments is greater than or equal to a reserved segment quantity of an $(i+1)^{th}$ type of segments in the b−a+1 types of segments, and determining the reserved code length corresponding to N based on the reserved segment quantity of each type of segments and the segment code length of each type of segments.

In a possible implementation, the determining, based on N, a minimum segment code length and a maximum segment code length, a reserved segment quantity of each type of segments in segments of b−a+1 types of segment code lengths and a reserved code length corresponding to N includes when $N<p*2^{\wedge a}$, determining that a reserved segment quantity that corresponds to N and that is of segments whose segment code lengths are $2^{\wedge a}$ is $$\text{floor}\left(\frac{N}{2^{\wedge a}}\right),$$

and a reserved segment quantity that corresponds to N and that is of segments whose segment code lengths are $2^{\wedge j}$ is 0, where $a<j\leq b$ and $p\geq 2$; when $$p*\sum_{i=a}^{c}2^{\wedge i} \leq N < p*\sum_{i=a}^{c+1}2^{\wedge i},$$

determining that a reserved segment quantity that corresponds to N and that is of segments whose segment code lengths are $2^{\wedge j}$ is 0, a reserved segment quantity that corresponds to N and that is of segments whose segment code lengths are $2^{\wedge c+1}$ is $$\text{floor}\left(\frac{N - p*\sum_{i=a}^{c}2^{\wedge i}}{2^{\wedge c+1}}\right),$$

and a reserved segment quantity that corresponds to N and that is of segments whose segment code lengths are $2^{\wedge v}$ is p, where $a\leq c\leq b-1$, $a\leq v\leq c$, and $c+1<j\leq b$; or when $$p*\sum_{i=a}^{b}2^{\wedge i} \leq N,$$

determining that the reserved segment quantity of each type of segments is p; and determining the reserved code length $N_{res}$ based on the reserved segment quantity of each type of segments, where $$N_{res} = \sum_{c=a}^{b}m_{c,N}*2^{\wedge c},$$

an $m_{c,N}$ represents a reserved segment quantity that corresponds to N and that is of segments whose segment code lengths are $2^{\wedge c}$. A value of p may be determined based on an actual case. Relative to a receiving rate, a lower reporting rate indicates a larger value of p.

When the reporting rate is considered substantially low, reporting of a last segment is not completed after a current segment is received. This causes an impact on a delay of decoding and reporting. In this embodiment, to reduce an impact of reporting of the $i^{th}$ segment on the delay of decoding and reporting, p segments are pre-reserved for segments of a same segment code length. Through implementation of the solution provided in this embodiment, an adverse impact of a low reporting rate on the delay of decoding and reporting can be reduced.

In a possible implementation, the determining, based on N, a minimum segment code length, and a maximum segment code length, a reserved segment quantity of each type of segments in segments of b−a+1 types of segment code lengths and a reserved code length corresponding to N includes when $N<2^{\wedge a}$; determining that the reserved segment quantity of each type of segments is 0; when $$\sum_{i=a}^{c}2^{\wedge i} \leq N < \sum_{i=a}^{c+1}2^{\wedge i},$$

determining that a reserved segment quantity of segments whose segment code lengths are $2^{\wedge j}$ is 0, and a reserved segment quantity of segments whose segment code lengths are $2^{\wedge v}$ is 1, where $a\leq c\leq b-1$, $a\leq v\leq c$, and $c<j\leq b$ or when $$\sum_{i=a}^{b}2^{\wedge i} \leq N,$$

determining that the reserved segment quantity of each type of segments is 1; and determining the reserved code length $N_{res}$ based on the reserved segment quantity of each type of segments, where $$N_{res} = \sum_{c=a}^{b}m_{c,N}*2^{\wedge c},$$

and $m_{c,N}$ represents a reserved segment quantity that corresponds to N and that is of segments whose segment code lengths are $2^{\wedge c}$.

In this embodiment, after the code length N is determined, a certain quantity of segments are pre-reserved for a segment type whose segment code length is small in the b−a+1 types of segments. This can reduce the delay of decoding and reporting. The solution provided in this embodiment is a case in which the value of p is 1. In this embodiment of this disclosure, a plurality of segments may not be reserved for segments of a same segment code length.

In a possible implementation, the orderly determining a segment quantity of each type of segments based on N, the reserved code length, a segment code length of each type of segments, and the reserved segment quantity of each type of segments and based on the segment code lengths from the largest to the smallest includes orderly determining a remaining segment quantity of each type of segments based on N, the reserved code length, and the segment code length of each type of segments and based on the segment code lengths from the largest to the smallest, where the remaining segment quantity of each type of segments is a remaining segment quantity of each type of segments corresponding to a remaining code length that is obtained by subtracting the reserved code length from N, and determining the segment quantity of each type of segments based on the reserved segment quantity of each type of segments and the remaining segment quantity of each type of segments.

In this embodiment of this disclosure, the remaining segment quantity of each type of segments is orderly determined based on the segment code lengths from the largest to the smallest, that is, the remaining code length is preferentially allocated to a segment type whose segment code length is determined large. This helps reduce a total segment quantity corresponding to N. A smaller segment quantity indicates better system performance.

In a possible implementation, the orderly determining a remaining segment quantity of each type of segments based on N, the reserved code length, and the segment code length of each type of segments and based on the segment code lengths from the largest to the smallest includes when $N<2^{\wedge a}$, determining that a remaining segment quantity $z_{c,N}$ that corresponds to N and that is of the segments whose segment code lengths are $2^{\wedge c}$ is 0, and a remaining segment quantity $z_{a,N}$ that corresponds to N and that is of the segments whose segment code lengths are $2^{\wedge a}$ is 1, where $a<c\leq b$; or when $N\geq 2^{\wedge a}$, orderly determining the remaining segment quantity of each type of segments based on the segment code lengths from the largest to the smallest, and determining that a remaining segment quantity $z_{b,N}$ that corresponds to N and that is of segments whose segment code lengths are $2^{\wedge b}$ is $$\text{floor}\left(\frac{N - N_{res}}{2^{\wedge b}}\right),$$

and a remaining segment quantity $z_{c,N}$ that corresponds to N and that is of the segments whose segment code lengths are $2^{\wedge c}$ is $$\text{floor}\left(\frac{N - N_{res} - \sum_{e=c+1}^{b} z_{e,N} * 2^{\wedge e}}{2^{\wedge c}}\right),$$

where $a\leq c<b$, and floor(x) represents rounding down x.

In a possible implementation, the determining the segment quantity of each type of segments based on the reserved segment quantity of each type of segments and the remaining segment quantity of each type of segments includes determining a segment quantity $M_{c,N}$ that corresponds to N and that is of the segments whose segment code lengths are $2^{\wedge c}$, where $M_{c,N}$ $m_{c,N}+z_{c,N}$, and $a\leq c\leq b$.

In this embodiment, segment code lengths of the S segments are in a decreasing trend, so that performance of a low-power communication system can be improved when a low delay requirement is met.

In a possible implementation, the determining a target information bit length of each segment based on the code rate and a segment code length of each segment in the S segments includes determining that a target information bit length of a segment whose segment code length is $2^{\wedge c}$ in the S segments is ceil($2^{\wedge c}*R$).

In this embodiment, the target information bit length of each segment is determined based on the code rate and the segment code length of each segment. To ensure that the target information bit length of the segment is a positive integer, ($2^{\wedge c}*R$) is rounded up.

In a possible implementation, the determining a target information bit length of each segment based on the code rate and a segment code length of each segment in the S segments includes when $$\sum_{c=a}^{b} M_{c,N} * \text{ceil}(2^{\wedge c} * R) = K_0,$$

determining that a target information bit length of a segment whose segment code length is $2^{\wedge c}$ is ceil($2^{\wedge c}*R$), where $a\leq c\leq b$; or when $$\sum_{c=a}^{b} M_{c,N} * \text{ceil}(2^{\wedge c} * R) > K_0,$$

determining that a target information bit length of a segment whose segment code length is $2^{\wedge c}$ is ceil($2^{\wedge c}*R$), target information bit lengths that correspond to N and that are of the first $M_{a,N}-1$ segments in $M_{a,N}$ segments whose segment code lengths are $2^{\wedge a}$ are ceil($2^{\wedge a}*R$), and a target information bit length of an $(M_{a,N})$th segment in the $M_{a,N}$ segment is $$K_0 - \sum_{c=a+1}^{b} M_{c,N} * \text{ceil}(2^{\wedge c} * R) + (M_{a,N} - 1) * \text{ceil}(2^{\wedge a} * R),$$

where the $(M_{a,N})^{th}$ segment is an $S^{th}$ segment in the S segments, and $a<c\leq b$.

In this embodiment, to ensure that a sum of target information bit lengths of the S segments is equal to the length of the to-be-encoded information bits, a target information bit length of the $S^{th}$ segment in the S segments can be adjusted.

In a possible implementation, the determining a target information bit length of each segment based on the code rate and a segment code length of each segment in the S segments includes determining a reference information bit length of each segment, and determining the target information bit length of each segment based on the reference information bit length of each segment and the segment quantity of each type of segments.

In this embodiment, the reference information bit length of each segment is determined first, and then the target information bit length of each segment is adjusted based on the reference information bit length and an actual requirement.

In a possible implementation, the determining a target information bit length of each segment based on the code rate and a segment code length of each segment in the S segments includes, when $$\sum_{c=a}^{b} M_{c,N} * \text{ceil}(2^{\wedge c} * R) = K_0,$$

determining that a reference information bit length that corresponds to N and that is of a segment whose segment code length is $2^{\wedge c}$ is ceil($2^{\wedge c}*R$), where $a\leq c\leq b$; or when $$\sum_{c=a}^{b} M_{c,N} * \text{ceil}(2^{\wedge c} * R) > K_0,$$

determining that a reference information bit length that corresponds to N and that is of a segment whose segment code length is $2^{\wedge c}$ is ceil($2^{\wedge c}*R$), reference information bit lengths of the first $M_{a,N}-1$ segments in $M_{a,N}$ segments are ceil($2^{\wedge a}*R$), and a reference information bit length of an $(M_{a,N})^{th}$ segment in the $M_{a,N}$ segments is $$K_0 - \sum_{c=a+1}^{b} M_{c,N} * \text{ceil}(2^{\wedge c} * R) + (M_{a,N} - 1) * \text{ceil}(2^{\wedge a} * R),$$

where the $(m_{a,N})^{th}$ segment is an $S^{th}$ segment in the S segments, and a<c≤b, and determining the target information bit length of each segment based on the reference information bit length of each segment and the segment quantity of each type of segments.

In a possible implementation, the reference information bit length of the segment whose segment code length is $2^{\wedge c}$ in the S segments is ceil($2^{\wedge c}*R$).

In a possible implementation, the determining the target information bit length of each segment based on the reference information bit length of each segment and the segment quantity of each type of segments includes determining the target information bit length of each segment according to an allocation principle. The allocation principle is that on the basis of the reference information bit length of each segment, a first information bit length is added to f segments whose segment code lengths are the largest in the S segments, h segments whose segment code lengths are not the largest in the S segments are reduced by the first information bit length, a segment code rate of a $(j+1)^{th}$ segment in the h segments is less than or equal to a segment code rate of a $j^{th}$ segment in the h segments, a segment code length of the $(j+1)^{th}$ segment is less than or equal to a segment code length of the $j^{th}$ segment, and a sum of target information bit lengths of the S segments is $K_0$, where f and h are positive integers, and a segment code rate of a segment equal to a target information bit length of the segment or a segment code length of the segment.

In a possible implementation, the determining the target information bit length of each segment based on the reference information bit length of each segment and the segment quantity of each type of segments includes determining a target information bit length of a first segment, where the target information bit length of the first segment is equal to a reference information bit length of the first segment plus a second information bit length, and the first segment is a segment whose segment code length is the largest in the S segments, and determining a target information bit length of a second segment, where the target information bit length of the second segment is equal to a reference information bit length of the second segment minus a third information bit length, and the second segment is a segment whose segment code length is not the largest in the S segments. In the S segments, h segments whose segment code lengths are not the largest are reduced by f times of the second information bit length, where a segment code rate of a $(j+1)^{th}$ segment in the h segments is less than or equal to a segment code rate of a $j^{th}$ segment in the h segments, a segment code length of the $(j+1)^{th}$ segment is less than or equal to a segment code length of the $j^{th}$ segment, a sum of target information bit lengths of the S segments is $K_0$, f is a segment quantity of segments whose segment code lengths are the largest in the S segments, and h is a positive integer greater than or equal to 0.

In this embodiment, information bit lengths of the segments whose segment code lengths are not the largest are adjusted, so that a segment with a smaller segment code length in the segments whose segment code lengths are not the largest has a smaller segment code rate. This improves system performance, and can further reduce the delay of decoding and reporting.

In a possible implementation, the determining the target information bit length of each segment based on the reference information bit length of each segment and the segment quantity of each type of segments includes when a segment code length of a segment whose segment code length is the largest in the S segments is $2^{\wedge a}$, determining that a target information bit length of the segment whose segment code length is $2^{\wedge a}$ is equal to a reference information bit length of the segment whose segment code length is $2^{\wedge a}$; or when a segment code length of a segment whose segment code length is the largest in the S segments is $2^{\wedge r}$, determining that a target information bit length of the segment whose segment code length is $2^{\wedge r}$ is a reference information bit length of the segment whose segment code length is $2^{\wedge r}$ plus $$\sum_{c=a}^{r-1} \partial_c^* M_{c,N},$$

and a target information bit length of a segment whose segment code length is $2^{\wedge c}$ is a reference information bit length of the segment whose segment code length is $2^{\wedge c}$ minus $\partial_c * M_{r,N}$, where a≤c<r, $\partial_c$ is a proportion parameter, and $\partial_c$ is a positive integer.

In a possible implementation, $0<\partial_{c+1} \leq 2\partial_c$.

In this embodiment, $0<\partial_{c+1} \leq 2\partial_c$, so that a segment with a smaller segment code length in the segments whose segment code lengths are not the largest has a smaller segment code rate.

In a possible implementation, when $M_{b,N}>T$, and T is a positive integer, the determining the target information bit length of each segment based on the reference information bit length of each segment and the segment quantity of each type of segments includes determining that target information bit lengths of the first T segments in $M_{b,N}$ segments whose segment code lengths are $2^{\wedge b}$ are a reference information bit length of the segment whose segment code length is $2^{\wedge b}$ plus $$\sum_{c=a}^{b-1} \partial_c^* M_{c,N},$$

target information bit lengths of the last $M_{b,N}-T$ segments in the $M_{b,N}$ segments are equal to the reference information bit length of the segment whose segment code length is $2^{\wedge b}$, and a target information bit length of a segment whose segment code length is $2^{\wedge c}$ is a reference information bit length of the segment whose segment code length is $2^{\wedge c}$ minus $\partial_c * T$, where a≤c<b, and $\partial_c$ is a positive integer.

In this embodiment, the following problems caused by a large segment quantity $M_{b,N}$ of segments whose segment code lengths are the largest can be resolved. An information bit length added for the segments whose segment code lengths are the largest in the S segments can be considered large. In addition, the information bit length reduced for the segments whose segment code lengths are not the largest in the S segments can be considered large.

In a possible implementation, the performing polar code encoding on the to-be-encoded information bits based on the target information bit length of each segment includes orderly allocating the to-be-encoded information bits to the S segments based on the target information bit length of each segment, and performing polar code encoding on information bits of each segment.

In a possible implementation, the performing polar code encoding on the to-be-encoded information bits based on the target information bit length of each segment includes when $$\sum_{c=a}^{b} M_{c,N} * \text{ceil}(2^{\wedge c} * R) = K_0,$$

orderly allocating the to-be-encoded information bits to the S segments based on the target information bit length of each segment, and performing polar code encoding on information bits of each segment; or when $$\sum_{c=a}^{b} M_{c,N} * \text{ceil}(2^{\wedge c} * R) > K_0,$$

performing zero-padding on to-be-encoded information bits whose information bit length is $K_0$, where the information bit length of the to-be-encoded information bits after zero-padding is $$\sum_{c=a}^{b} M_{c,N} * \text{ceil}(2^{\wedge c} * R),$$

orderly allocating the to-be-encoded information bits after zero-padding to the S segments based on the target information bit length of each segment, and performing polar code encoding on information bits of each segment.

In this embodiment, a round up operation is used in a process of determining the target information bit length of each segment, so that the sum of the target information bit lengths of the S segments corresponding to N is greater than the length of the to-be-encoded information bits. Through a zero-padding operation, the length of the to-be-encoded information bits after zero-padding can be equal to the sum of the target information bit lengths of the S segments. This may allow to perform polar code encoding on each segment.

According to a second aspect, an embodiment provides a terminal device. The terminal device may include a plurality of functional processors, modules or units configured to correspondingly perform the polar code segment encoding method provided in the first aspect. The processors, modules or units may be combined in a single processor of a communication device.

For example, the terminal device may include a code length determining processor, a reservation processor, a segment quantity determining processor, an information bit length determining processor, and an encoding processor.

The code length determining processor is configured to determine, based on a length of to-be-encoded information bits and a code rate, a code length N after encoding, where N is a positive integer.

The reservation processor is configured to determine, based on N, a minimum segment code length, and a maximum segment code length, a reserved segment quantity of each type of segments in segments of b−a+1 types of segment code lengths and a reserved code length corresponding to N, where a value of the minimum segment code length is $2^{\wedge a}$, a value of the maximum segment code length is $2^{\wedge b}$, the b−a+1 types of segment code lengths of the segments are $2^{\wedge c}$, a, b, and c are positive integers, a<b, and a≤c≤b.

The segment quantity determining processor is configured to orderly determine a segment quantity of each type of segments based on N, the reserved code length, a segment code length of each type of segments, and the reserved segment quantity of each type of segments and based on the segment code lengths from the largest to the smallest, where a sum of segment quantities of types of segments is equal to S, N corresponds to S segments, and a segment code length of an $i^{th}$ segment in the S segments is greater than or equal to a segment code length of an $(i+1)^{th}$ segment in the S segments.

The information bit length determining processor is configured to determine a target information bit length of each segment based on the code rate and a segment code length of each segment in the S segments.

The encoding processor is configured to perform polar code encoding on the to-be-encoded information bits based on the target information bit length of each segment.

In a possible implementation, the code length determining processor is specifically configured to determine a theoretical code length L based on the length $K_0$ of the to-be-encoded information bits and the code rate R, where a value of the theoretical code length is $\text{ceil}(K_0/R)$, and $\text{ceil}(x)$ represents rounding up x; and determine N based on the theoretical code length and the minimum segment code length $2^{\wedge a}$, where a value of N is $\text{ceil}(L/2^{\wedge a})*2^{\wedge a}$.

In a possible implementation, the reservation processor is configured to determine the segments of the b−a+1 types of segment code lengths based on the minimum segment code length and the maximum segment code length, where the value of the minimum segment code length is $2^{\wedge a}$, the value of the maximum segment code length is $2^{\wedge b}$, the b−a+1 types of segment code lengths of the segments are $2^{\wedge c}$, a, b, and c are positive integers, a<b, and a≤c≤b; orderly determine a reserved segment quantity of an $i^{th}$ type of segments in the b−a+1 types of segments based on the b−a+1 types of segment code lengths of the segments from the smallest to the largest and based on N and the segment code length of each type of segments in the b−a+1 types of segments, where the reserved segment quantity of the $i^{th}$ type of segments is greater than or equal to a reserved segment quantity of an $(i+1)^{th}$ type of segments in the b−a+1 types of segments; and determine the reserved code length corresponding to N based on the reserved segment quantity of each type of segments and the segment code length of each type of segments.

In a possible implementation, the reservation processor is configured to when $N<p*2^{\wedge a}$, determine that a reserved segment quantity that corresponds to N and that is of segments whose segment code lengths are $2^{\wedge a}$ is $$\text{floor}\left(\frac{N}{2^{\wedge a}}\right),$$

and a reserved segment quantity that corresponds to N and that is of segments whose segment code lengths are $2^{\wedge j}$ is 0, where a<j≤b, and p≥2; when $$p * \sum_{i=a}^{c} 2^{\wedge i} \leq N < p * \sum_{i=a}^{c+1} 2^{\wedge i},$$

determine that a reserved segment quantity that corresponds to N and that is of segments whose segment code lengths are $2^{\wedge j}$ is 0, a reserved segment quantity that corresponds to N and that is of segments whose segment code lengths are $2^{\wedge c+1}$ is $$\text{floor}\left(\frac{N - p * \Sigma_{i=a}^{c} 2^{\wedge i}}{2^{\wedge c+1}}\right),$$

and a reserved segment quantity that corresponds to N and that is of segments whose segment code lengths are $2^{\wedge v}$ is p, where a≤c≤b−1, a≤v≤c, and c+1<j≤b; or when $$p * \sum_{i=a}^{b} 2^{\wedge i} \leq N,$$

determine that the reserved segment quantity of each type of segments is p; and determine the reserved code length $N_{res}$ based on the reserved segment quantity of each type of segments, where $$N_{res} = \sum_{c=a}^{b} m_{c,N} * 2^{\wedge c},$$

and $m_{c,N}$ represents a reserved segment quantity that corresponds to N and that is of segments whose segment code lengths are $2^{\wedge c}$.

In a possible implementation, the reservation processor is configured to when N<$2^{\wedge a}$, determine that the reserved segment quantity of each type of segments is 0; when $$\sum_{i=a}^{c} 2^{\wedge i} \leq N < \sum_{i=a}^{c+1} 2^{\wedge i},$$

determine that a reserved segment quantity of segments whose segment code lengths are $2^{\wedge j}$ is 0, and a reserved segment quantity of segments whose segment code lengths are $2^{\wedge v}$ is 1, where a≤c≤b−1, a≤v≤c, and c<j≤b; or when $$\sum_{i=a}^{b} 2^{\wedge i} \leq N,$$

determine that the reserved segment quantity of each type of segments is 1; and determine the reserved code length $N_{res}$ based on the reserved segment quantity of each type of segments, where $$N_{res} = \sum_{c=a}^{b} m_{c,N} * 2^{\wedge c},$$

and $m_{c,N}$ represents a reserved segment quantity that corresponds to N and that is of segments whose segment code lengths are $2^{\wedge c}$.

In a possible implementation, the segment quantity determining processor includes a remaining segment quantity determining processor and a second segment quantity determining processor.

The remaining segment quantity determining processor is configured to orderly determine a remaining segment quantity of each type of segments based on N, the reserved code length, and the segment code length of each type of segments and based on the segment code lengths from the largest to the smallest, where the remaining segment quantity of each type of segments is a remaining segment quantity of each type of segments corresponding to a remaining code length that is obtained by subtracting the reserved code length from N.

The second segment quantity determining processor is configured to determine the segment quantity of each type of segments based on the reserved segment quantity of each type of segments and the remaining segment quantity of each type of segments.

In a possible implementation, the remaining segment quantity determining processor is configured to when N<$2^{\wedge a}$, determine that a remaining segment quantity $z_{c,N}$ that corresponds to N and that is of the segments whose segment code lengths are $2^{\wedge c}$ is 0, and a remaining segment quantity $z_{a,N}$ that corresponds to N and that is of the segments whose segment code lengths are $2^{\wedge a}$ is 1, where a<c≤b; or when N≥$2^{\wedge a}$, orderly determine the remaining segment quantity of each type of segments based on the segment code lengths from the largest to the smallest, and determine that a remaining segment quantity $z_{b,N}$ that corresponds to N and that is of segments whose segment code lengths are $2^{\wedge b}$ is $$\text{floor}\left(\frac{N - N_{res}}{2^{\wedge b}}\right),$$

and a remaining segment quantity $z_{c,N}$ that corresponds to N and that is of the segments whose segment code lengths are $2^{\wedge c}$ is $$\text{floor}\left(\frac{N - N_{res} - \sum_{e=c+1}^{b} z_{e,N} * 2^{\wedge e}}{2^{\wedge c}}\right),$$

where a≤c<b, and floor(x) represents rounding down x.

In a possible implementation, the second segment quantity determining processor is configured to determine a segment quantity $M_{c,N}$ that corresponds to N and that is of the segments whose segment code lengths are $2^{\wedge c}$, where $M_{c,N}=m_{c,N}+z_{c,N}$, and a≤c≤b.

In a possible implementation, the information bit length determining processor is configured to determine that a target information bit length of a segment whose segment code length is $2^{\wedge c}$ in the S segments is ceil($2^{\wedge c}*R$).

In a possible implementation, the information bit length determining processor is configured to when $$\sum_{c=a}^{b} M_{c,N} * \text{ceil}(2^{\wedge c} * R) = K_0,$$

determine that a target information bit length of a segment whose segment code length is $2^{\wedge c}$ is ceil($2^{\wedge c}*R$), where $a \leq c \leq b$; or when $$\sum_{c=a}^{b} M_{c,N} * \text{ceil}(2^{\wedge c} * R) > K_0,$$

determine that a target information bit length of a segment whose segment code length is $2^{\wedge c}$ is ceil($2^{\wedge c}*R$), target information bit lengths that correspond to N and that are of the first $M_{a,N}-1$ segments in $M_{a,N}$ segments whose segment code lengths are $2^{\wedge a}$ are ceil($2^{\wedge a}*R$), and a target information bit length of an $(M_{a,N})^{th}$ segment in the $M_{a,N}$ segments is $$K_0 - \sum_{c=a+1}^{b} M_{c,N} * \text{ceil}(2^{\wedge c} * R) + (M_{a,N} - 1) * \text{ceil}(2^{\wedge a} * R),$$

where the $(M_{a,N})^{th}$ segment is an $S^{th}$ segment in the S segments, and $a < c \leq b$.

In a possible implementation, the information bit length determining processor includes a reference information bit length determining processor and a target information bit length determining processor.

The reference information bit length determining processor is configured to determine the reference information bit length of each segment.

The target information bit length determining processor is configured to determine the target information bit length of each segment based on the reference information bit length of each segment and the segment quantity of each type of segments.

In a possible implementation, the reference information bit length determining processor is configured to when $$\sum_{c=a}^{b} M_{c,N} * \text{ceil}(2^{\wedge c} * R) = K_0,$$

determine that a reference information bit length that corresponds to N and that is of a segment whose segment code length is $2^{\wedge c}$ is ceil($2^{\wedge c}*R$), where $a \leq c \leq b$; or when $$\sum_{c=a}^{b} M_{c,N} * \text{ceil}(2^{\wedge c} * R) > K_0,$$

determine that a reference information bit length that corresponds to N and that is of a segment whose segment code length is $2^{\wedge c}$ is ceil($2^{\wedge c}*R$), reference information bit lengths of the first $M_{a,N}-1$ segments in $M_{a,N}$ segments are ceil($2^{\wedge a}*R$), and a reference information bit length of an $(M_{a,N})^{th}$ segment in the $M_{a,N}$ segments is $$K_0 - \sum_{c=a+1}^{b} M_{c,N} * \text{ceil}(2^{\wedge c} * R) + (M_{a,N} - 1) * \text{ceil}(2^{\wedge a} * R),$$

where the $(M_{a,N})^{th}$ segment is an $S^{th}$ segment in the S segments, and $a < c \leq b$.

In a possible implementation, the reference information bit length of the segment whose segment code length is $2^{\wedge c}$ in the S segments is ceil($2^{\wedge c}*R$).

In a possible implementation, the target information bit length determining processor is configured to determine the target information bit length of each segment according to an allocation principle. The allocation principle is that, on the basis of the reference information bit length of each segment, a first information bit length is added to f segments whose segment code lengths are the largest in the S segments, h segments whose segment code lengths are not the largest in the S segments are reduced by the first information bit length, a segment code rate of a $(j+1)^{th}$ segment in the h segments is less than or equal to a segment code rate of a $j^{th}$ segment in the h segments, a segment code length of the $(j+1)^{th}$ segment is less than or equal to a segment code length of the $j^{th}$ segment, and a sum of target information bit lengths of the S segments is $K_0$, where f and h are positive integers.

In a possible implementation, the target information bit length determining processor is configured to determine a target information bit length of a first segment, where the target information bit length of the first segment is equal to a reference information bit length of the first segment plus a second information bit length, and the first segment is a segment whose segment code length is the largest in the S segments, and determine a target information bit length of a second segment, where the target information bit length of the second segment is equal to a reference information bit length of the second segment minus a third information bit length, and the second segment is a segment whose segment code length is not the largest in the S segments. In the S segments, h segments whose segment code lengths are not the largest are reduced by f times of the second information bit length, where a segment code rate of a $(j+1)^{th}$ segment in the h segments is less than or equal to a segment code rate of a $j^{th}$ segment in the h segments, a segment code length of the $(j+1)^{th}$ segment is less than or equal to a segment code length of the $j^{th}$ segment, a sum of target information bit lengths of the S segments is $K_0$, f is a segment quantity of segments whose segment code lengths are the largest in the S segments, and h is a positive integer greater than or equal to 0.

In a possible implementation, the target information bit length determining processor is configured to when a segment code length of a segment whose segment code length is the largest in the S segments is $2^{\wedge a}$, determine that a target information bit length of the segment whose segment code length is $2^{\wedge a}$ is equal to a reference information bit length of the segment whose segment code length is $2^{\wedge a}$; or when a segment code length of a segment whose segment code length is the largest in the S segments is $2^{\wedge r}$, determine that a target information bit length of the segment whose segment code length is $2^{\wedge r}$ is a reference information bit length of the segment whose segment code length is $2^{\wedge r}$ plus $$\sum_{c=a}^{r-1} \partial_c * M_{c,N},$$

and a target information bit length of a segment whose segment code length is $2^{\wedge c}$ is a reference information bit length of the segment whose segment code length is $2^{\wedge c}$ minus $\partial_c * M_{r,N}$, where $a \leq c < r$, $\partial_c$ is a proportion parameter, and $\partial_c$ is a positive integer.

In a possible implementation, $0 < \partial_{c+1} \leq 2\partial_c$.

In a possible implementation, when $M_{b,N} > T$, and T is a positive integer, the target information bit length determining processor is configured to determine that target information bit lengths of the first T segments in $M_{b,N}$ segments whose segment code lengths are $2^{\wedge b}$ are a reference information bit length of the segment whose segment code length is $2^{\wedge b}$ plus $$\sum_{c=a}^{b-1} \partial_c * M_{c,N},$$

target information bit lengths of the last $M_{b,N} - T$ segments in the $M_{b,N}$ segments are equal to the reference information bit length of the segment whose segment code length is $2^{\wedge b}$, and a target information bit length of a segment whose segment code length is $2^{\wedge c}$ is a reference information bit length of the segment whose segment code length is $2^{\wedge c}$ minus $\partial_c * T$, where $a \leq c < b$, and $\partial_c$ is a positive integer.

In a possible implementation, $0 < \partial_{c+1} \leq 2\partial_c$.

In a possible implementation, the encoding processor is configured to orderly allocate the to-be-encoded information bits to the S segments based on the target information bit length of each segment, and perform polar code encoding on information bits of each segment.

In a possible implementation, the encoding processor is configured to when $$\sum_{c=a}^{b} M_{c,N} * \mathrm{ceil}(2^{\wedge c} * R) = K_0,$$

orderly allocate the to-be-encoded information bits to the S segments based on the target information bit length of each segment, and perform polar code encoding on information bits of each segment; or when $$\sum_{c=a}^{b} M_{c,N} * \mathrm{ceil}(2^{\wedge c} * R) > K_0,$$

perform zero-padding on to-be-encoded information bits whose information bit length is $K_0$, where the information bit length of the to-be-encoded information bits after zero-padding is $$\sum_{c=a}^{b} M_{c,N} * \mathrm{ceil}(2^{\wedge c} * R),$$

orderly allocate the to-be-encoded information bits after zero-padding to the S segments based on the target information bit length of each segment, and perform polar code encoding on information bits of each segment.

According to a third aspect, an embodiment provides a communication device, configured to perform the polar code segment encoding method provided in the first aspect. The network device may include a memory, a processor, a transmitter, and a receiver, where the transmitter and the receiver are configured to communicate with another communication device. The memory is configured to store implementation code of the polar code segment encoding method provided in the first aspect, and the processor is configured to execute program code stored in the memory, that is, perform the polar code segment encoding method provided in the first aspect.

According to a fourth aspect, this disclosure provides a communication chip. The communication chip may include a processor and one or more interfaces coupled to the processor. The processor may be configured to invoke some or all of implementation programs of the polar code segment encoding method provided in the first aspect from a memory, and execute instructions included in some or all of the implementation programs. The interface may be configured to output a data processing result of the processor.

According to a fifth aspect, an embodiment provides a computer-readable storage medium, where the readable storage medium stores program instructions, and when the program instructions are run on a processor, the processor is enabled to perform the polar code segment encoding method described in the third aspect.

According to a sixth aspect, an embodiment provides a computer program product including instructions, and when the computer program product is run on a processor, the processor is enabled to perform the polar code segment encoding method described in the first aspect.

BRIEF DESCRIPTION OF DRAWINGS

FIG. 5 is a schematic flowchart of polar code segment encoding according to an embodiment;

DESCRIPTION OF EMBODIMENTS

The following clearly describes technical solutions in embodiments of this disclosure in detail with reference to accompanying drawings. In descriptions of the embodiments, unless otherwise stated, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of the embodiments, "a plurality of" means two or more.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more.

Figure 1:
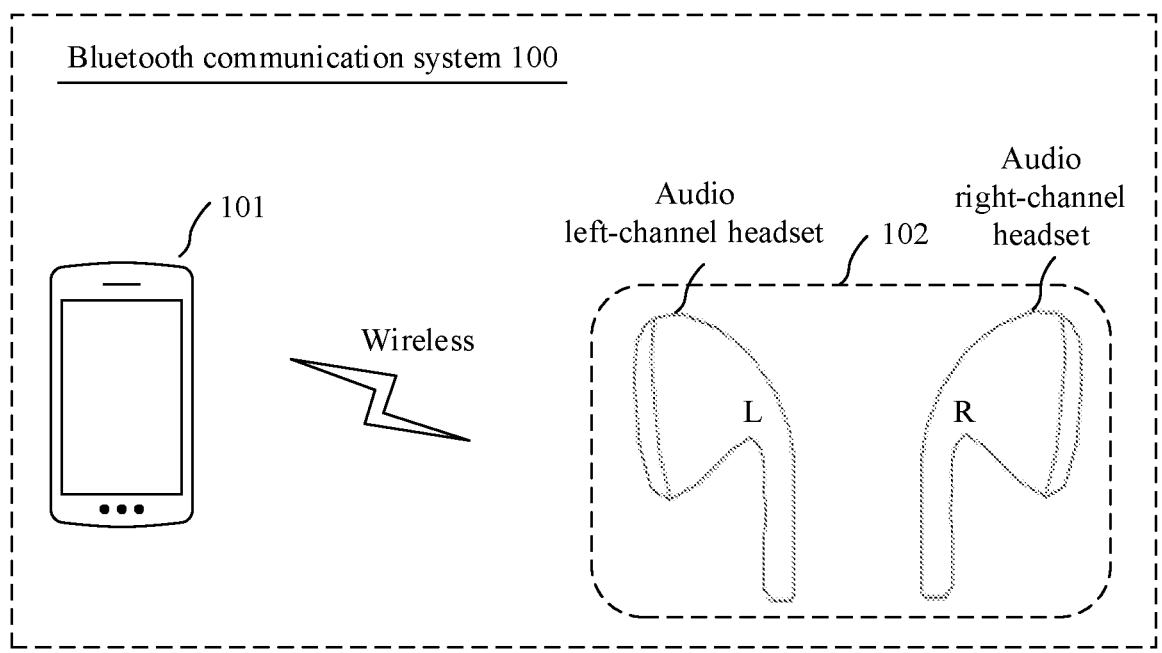
FIG. 1 is a schematic diagram of a system architecture of a Bluetooth communication system according to an embodiment.

FIG. 1 shows a network architecture of a Bluetooth communication system 100 according to an embodiment. As shown in FIG. 1, the communication system 100 may include a terminal device 101 and a Bluetooth headset 102.

The Bluetooth communication system 100 is based on a Bluetooth technology. The Bluetooth technology is an open global specification for wireless data and voice communication. The Bluetooth technology is based on a low-cost short-range wireless connection, and is a certain short-range wireless connection technology for establishing communication environments for fixed and mobile devices. The Bluetooth technology enables some portable mobile devices and computer devices today to connect to the Internet without requiring cables, and to access the Internet wirelessly. The Bluetooth technology replaces an infrared technology, to be applied to computers and mobile communication products with advantages of low costs, low power consumption, a short range, a high frequency (a frequency hopping technology), and high confidentiality.

The terminal device 101 may be fixed, or may be mobile. In some embodiments, the terminal device 101 may be implemented as a mobile device, user equipment (UE), a terminal, a UE unit, a ULE station, a mobile device, or the like. This is not limited in this embodiment.

The Bluetooth headset 102 may be fixed, or may be mobile. A distance between the Bluetooth headset 102 and the terminal device 101 falls within a preset range. As shown in FIG. 1, the Bluetooth headset may be divided into an audio-left channel headset and an audio-right channel headset. One of the audio left-channel headset and the audio-right channel headset is a primary headset of the Bluetooth headset 102, and the other is a secondary headset of the Bluetooth headset 102.

The Bluetooth communication system 100 is sensitive to a delay. After receiving data, the Bluetooth headset needs to process the data in a determined short time and reply with an acknowledgment message. For example, an interval duration from a time point at which the terminal device 101 completes sending the data to a time point the terminal device 101 receives an ACK of the primary headset may be 189 μs.

Figure 2:
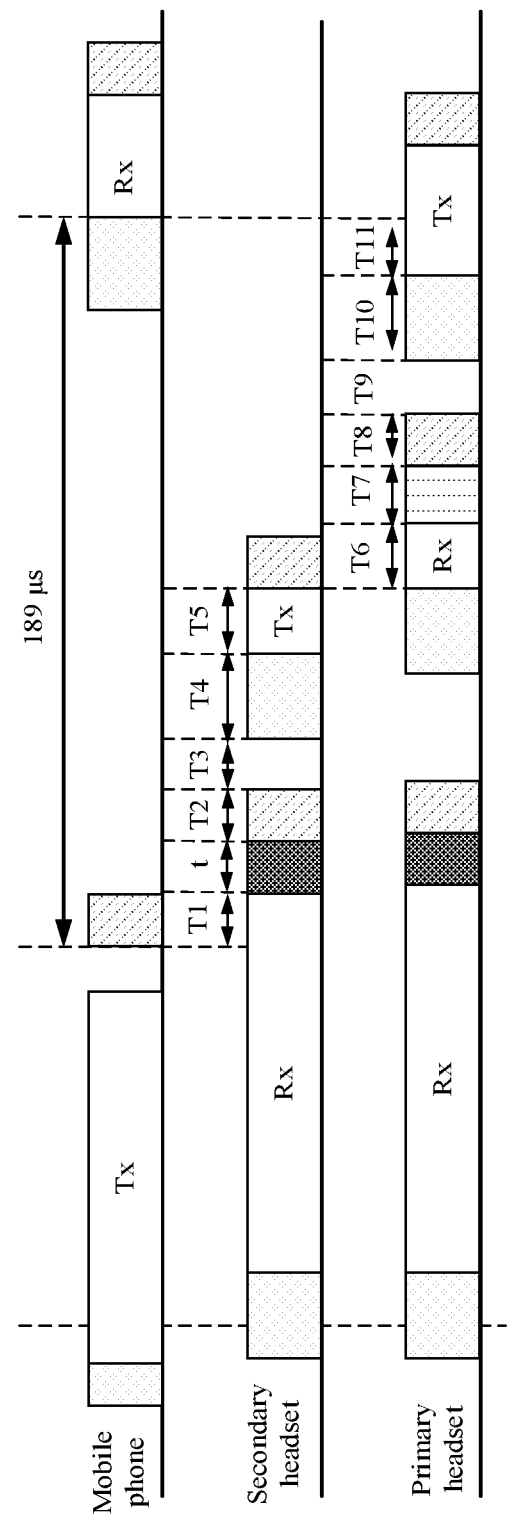
FIG. 2 is a schematic diagram of data transmission according to an embodiment.

FIG. 2 is a schematic diagram of data transmission according to an embodiment, where T1 represents a receiving delay of the secondary headset, T2 represents duration in which the secondary headset receives a power-off procedure, T3 represents a processing delay of a media access control (MAC) layer, T4 represents duration in which the secondary headset receives a power-on procedure, T5 represents duration in which the secondary headset sends a notification message to the primary headset, and the notification message is used to notify that the primary headset has received data, T6 represents a synchronization delay and a receiving delay of the primary headset, T7 represents waiting duration of a receiving window, T8 represents duration in which the primary headset receives a power-off procedure, T9 represents a processing delay of a MAC layer, T10 represents duration in which the primary headset sends a power-on procedure, T11 represents a receiving delay of a mobile phone, and t represents duration in which the secondary headset performs decoding and reporting. For example, the duration of T1 is about 10 μs, the duration of T2 is 10 μs, the duration of T3 is about 10 μs, the duration of T4 is 35 μs, the duration of T5 is 40 μs, the duration of T6 is 15 μs, the duration of T7 is 6 μs, the duration of T8 is 10 μs, the duration of T9 is 4 μs, the duration of T10 is 25 μs, and the duration of T11 is 5 μs. As shown in FIG. 2, after receiving complete information sent by the mobile phone, the secondary headset has a t μs time margin to complete decoding and data reporting, where t=189−T1−T2−T3−T4−T5−T6−T7−T8−T9−T10−T11, and t=15 μs.

For a system that requires low power consumption, for example, a Bluetooth system, power of information reporting is usually limited. Consequently, a reporting rate of reporting information bits to the MAC layer is limited to the power of information reporting. For ease of description, in this disclosure, duration from a time point at which complete data sent by the terminal device is received by the primary headset and/or the secondary headset to a time point at which the primary headset and/or the secondary headset performs decoding and reporting is referred to as a delay of decoding and reporting, and the delay of decoding and reporting may be expected to be less than or equal to t. If the delay of decoding and reporting exceeds t, the mobile phone may not accurately receive the acknowledgment message fed back by the primary headset.

An existing Bluetooth system usually uses an encoding manner in which no channel code or convolutional code is used. Although the foregoing two encoding manners may meet a delay requirement, performance of the Bluetooth system is to be improved. In this disclosure, performance of the system is improved by using polar code.

Polar (Polar) code is the first encoding manner that is theoretically proven to reach a Shannon capacity, and has characteristics of high performance and low encoding and decoding complexity. In different code lengths, especially for code based on a finite field, performance of the polar code may be more improved than Turbo code and low density parity check (LDPC) code. The polar code has become an encoding manner for new radio (NR) control information of the 3rd generation partnership project protocol (3GPP).

The polar code is linear block code, a generation matrix of the polar code is $F_N$, and an encoding process of the polar code is $x_1^N = u_1^N F_N \cdot u_1^N = (u_1, u_2, \ldots, u_N)$ is a binary row vector with a length N (namely, a code length). $F_N$ is a matrix of N×N, and $F_N = F_2^{\otimes (log_2(N))}$. Herein, $$F_2 = \begin{bmatrix} 1 & 0 \\ 1 & 1 \end{bmatrix},$$

and $F_2^{\otimes (log_2(n))}$ is defined as a Kronecker product of $log_2$ N matrices $F_2$.

In the encoding process of the polar code, some bits in $u_1^N$ are used to carry information, and are referred to as information bits. A set of indexes of these bits is recorded as I. The other bits are set to be fixed values pre-appointed by a transmit end and a receive end, and are referred to as fixed bits. A set of indexes of these bits is represented by a complementary set $I^c$ of I. The fixed bits are usually set to 0. However, the fixed bits may be randomly set provided that the transmit end and the receive end reach an agreement in advance.

For the polar code, encoding and decoding are performed based on a segment code length (a power of 2). A longer segment code length indicates a stronger error correcting capability and greater complexity. Therefore, an appropriate segment code length may be selected after performance and complexity are weighed. The polar code is linear block code. If a transmitted data packet is large, which may exceed a maximum segment code length set by the polar code, in this case, segment processing may be performed on transmitted data.

There are two polar code segmentation manners in 5G. In a first segmentation manner, an information bit sequence is evenly divided into two segments. If an information bit length of the information bit sequence cannot be divided by 2, zero-padding is performed at a front end of a first segment in the two segments. When polar code segment encoding is performed in the first segmentation manner, rate matching needs to be performed on a total of segments, that is, a segment code length of each segment obtained after polar code encoding is converted to a required length in a manner of puncturing, shortening, or repetition. It may be understood that the required length meets the power of 2.

Figure 3:
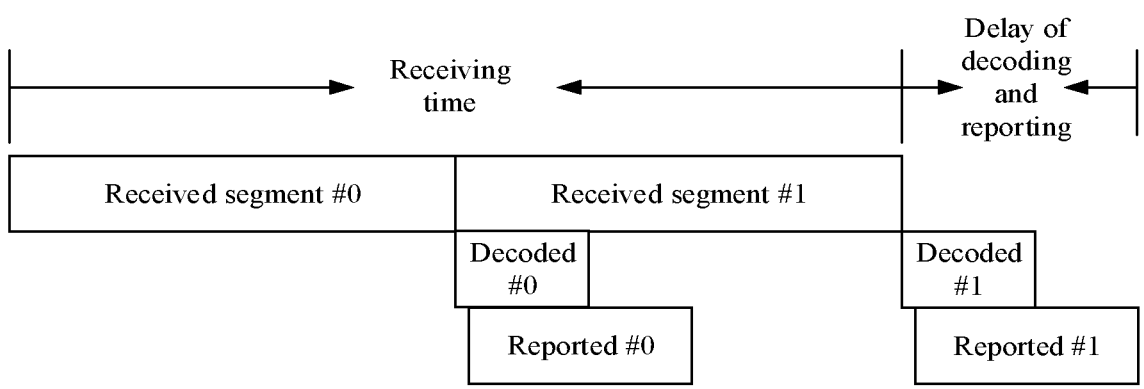
FIG. 3 is a schematic diagram of a delay of decoding and reporting according to an embodiment.

In the first segmentation manner, rate matching is performed, which increases implementation complexity and is not applicable to a low-power system. In addition, the first segmentation manner may not meet a delay requirement of decoding and reporting. For example, FIG. 3 is a schematic diagram of a delay of decoding and reporting of a first segmentation manner according to an embodiment. For example, in the Bluetooth communication system, a Bluetooth bandwidth is less than or equal to 3 megabit per second (Mb/s), a reporting bandwidth is equal to 8 Mb/s, and a code rate is equal to 2/3. If an information bit length $K_1$ of a second segment (segment #1) in the two segments is 683, and a segment code length $N_1$ is 1024, a reporting time of the second segment is $K_1/8$ µs, namely, 83.375 µs, which exceeds a 15 µs delay limit of decoding and reporting.

In a second segmentation manner, an information bit sequence is divided into n segments based on a maximum segment code length, and code rates corresponding to the n segments are equal. Segment code lengths of the first n−1 segments in the n segments are the maximum segment code length, and information bit lengths of the first n−1 segments may be determined based on the maximum segment code length and the code rates. An information bit length of the last segment in the n segments may be determined, and then a segment code length of the last segment may be determined based on the code rate and the information bit length of the last segment.

Figure 4:
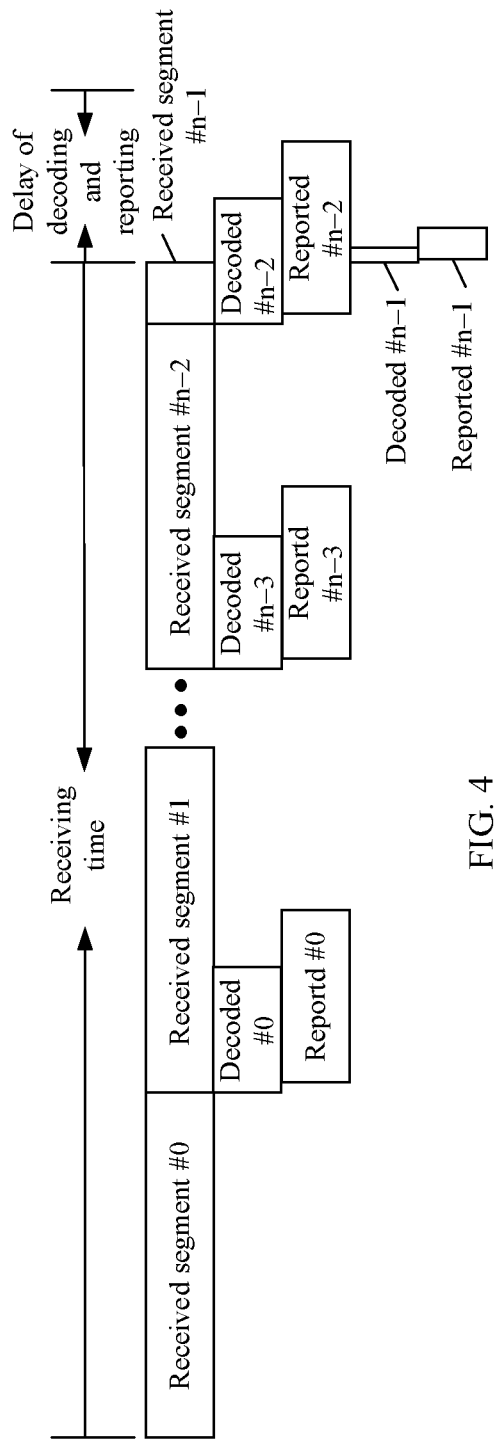
FIG. 4 is a schematic diagram of another delay of decoding and reporting according to an embodiment.

In the second segmentation manner, rate matching is not performed. Compared with the first segmentation manner, implementation complexity is reduced. However, the second segmentation manner may alternatively not meet the delay limit of decoding and reporting. For example, FIG. 4 is a schematic diagram of a delay of decoding and reporting of a second segmentation manner according to an embodiment. For example, in the Bluetooth communication system, a Bluetooth bandwidth is less than or equal to 3 Mb/s, a reporting bandwidth is equal to 8 Mb/s, and a code rate is equal to 2/3. If a segment code length $N_2$ of an $(n-1)^{th}$ segment (segment #n−2) in the n segments is 1024, and an information bit length $K_2$ is 683, a reporting time of the $(n-1)^{th}$ segment is 83.375 µs. If an information bit length $K_3$ of an $n^{th}$ segment (segment #n−1) in the n segments is 10, and a segment code length $N_3$ is 16, a receiving time of the $n^{th}$ segment is 16/3 Mb/s, namely, 5.3 µs, and a delay of decoding and reporting after data of the $n^{th}$ segment is received is 85.375 µs-5.3 µs, namely, 80.075 µs, which exceeds a 15 µs delay limit of decoding and reporting. In the second segmentation manner, if the information bit length of the $n^{th}$ segment is determined small, a total of receiving duration, decoding duration, and reporting duration are relatively small. In this case, the delay of decoding and reporting is limited to reporting duration of the $(n-1)^{th}$ segment.

In embodiments herein, the system can be improved by using the polar code. In addition, a new segmentation method is proposed by using a characteristic that the polar code is linear block code, to meet a delay limit on decoding and reporting of a low-power system.

An embodiment provides a polar code segment encoding method. FIG. 5 is a schematic flowchart of a polar code segment encoding method according to an embodiment. As shown in FIG. 5, the polar code segment encoding method provided in this embodiment includes but is not limited to steps S501 to S505. The following further describes possible implementations of the method embodiment.

S501: Determine, based on a length of to-be-encoded information bits and a code rate, a code length N after encoding, where N is a positive integer.

Optionally, based on the foregoing analysis, the determining, based on a length of to-be-encoded information bits and a code rate, a code length N after encoding includes determining a theoretical code length L based on the length $K_0$ of the to-be-encoded information bits and the code rate R, where a value of the theoretical code length is ceil($K_0$/R), and ceil(x) represents rounding up x; and determining N based on the theoretical code length and the minimum segment code length $2^a$, where a value of N is ceil(L/$2^a$) *$2^a$. According to the determining manner of the code length N, it can be ensured that an actual code length N after encoding is an integer multiple of the minimum segment code length.

In this embodiment, segment code lengths of a total of segments corresponding to the code length N is equal to a power of 2, and a segment code length of each segment is greater than or equal to a preset minimum segment code length. It may be understood that in the foregoing case, a sum (that is, the actual code length after encoding) of the segment code lengths of a total of the segments is an integer multiple of the minimum segment code length. In the determining manner of the code length N, rate matching is not performed, and implementation complexity is not increased. Therefore, the determining manner is applicable to a low-power system.

S502: Determine, based on N, a minimum segment code length, and a maximum segment code length, a reserved segment quantity of each type of segments in segments of b−a+1 types of segment code lengths and a reserved code length corresponding to N, where a value of the minimum segment code length is $2^a$, a value of the maximum segment code length is $2^b$, the b−a+1 types of segment code lengths of the segments are $2^c$, a, b, and c are positive integers, a<b, and a≤c≤b.

Optionally, if the value of the minimum segment code length is $2^a$, and the value of the maximum segment code length is $2^b$, the segments of the b−a+1 types of segment code lengths may be determined based on the minimum segment code length and the maximum segment code length, the b−a+1 types of segment code lengths of the segments are $2^c$, a, b, and c are positive integers, a<b, and a≤c≤b.

In this embodiment, the code length N is divided into S segments. The S segments include one or more types of segments in the b−a+1 types of segments that correspond to the b−a+1 types of segment code lengths. A delay of decoding and reporting can be limited to the last y segments of the S segments, where S and y are positive integers, and y is less than or equal to S.

It may be understood that in this embodiment, a segment code length of each type of segments is equal to the power of 2. Therefore, implementation complexity can be relatively reduced in the solution provided in this embodiment.

Optionally, segment code lengths of the last y segments of the S segments are less than segment code lengths of the first S-y segments of the S segments.

It may be understood that a smaller information bit length of a segment (in a same code rate, a smaller segment code length of the segment) indicates shorter duration of decoding and reporting. The segment code lengths of the last y segments being less than the segment code lengths of the first S-y segments can reduce the delay of decoding and reporting.

Optionally, a segment code length of an $(i+1)^{th}$ segment in the S segments is less than or equal to a segment code length of an $(i+1)^{th}$ segment in the S segments.

It may be understood that, to avoid a case in which the delay of decoding and reporting is limited to reporting duration of the penultimate segment because an information bit length (a segment code length) of the last segment is considered substantially smaller than an information bit length (a segment code length) of the penultimate segment, in this embodiment, a segment code length of a $(j+1)^{th}$ segment in the last y segments is less than or equal to a segment code length of a $j^{th}$ segment in the last y segments, so that the segment code lengths of the last y segments are in a decreasing trend.

In some embodiments, to implement that the segment code lengths of the last y segments of the S segments are less than the segment code lengths of the first S-y segments of the S segments, and the segment code length of the $(j+1)^{th}$ segment of the last y segments is less than or equal to the segment code length of the $j^{th}$ segment of the last y segments, after the code length N is determined, a certain quantity of segments are pre-reserved for a segment type whose segment code length is considered small in the b−a+1 types of segments.

Optionally, the determining, based on N, a minimum segment code length, and a maximum segment code length, a reserved segment quantity of each type of segments in segments of b−a+1 types of segment code lengths and a reserved code length corresponding to N, where a value of the minimum segment code length is $2^{\wedge a}$, a value of the maximum segment code length is $2^{\wedge b}$, the b−a+1 types of segment code lengths of the segments are $2^{\wedge c}$, a, b, and c are positive integers, a<b, and a≤c≤b includes determining the segments of the b−a+1 types of segment code lengths based on the minimum segment code length and the maximum segment code length, where the value of the minimum segment code length is $2^{\wedge a}$, the value of the maximum segment code length is $2^{\wedge b}$, the b−a+1 types of segment code lengths of the segments are $2^{\wedge c}$, a, b, and c are positive integers, a<b, and a≤c≤b, orderly determining a reserved segment quantity of an $i^{th}$ type of segments in the b−a+1 types of segments based on the b−a+1 types of segment code lengths of the segments from the smallest to the largest and based on N and the segment code length of each type of segments in the b−a+1 types of segments, where the reserved segment quantity of the $i^{th}$ type of segments is greater than or equal to a reserved segment quantity of an $(i+1)^{th}$ type of segments in the b−a+1 types of segments, and determining the reserved code length corresponding to N based on the reserved segment quantity of each type of segments and the segment code length of each type of segments.

Optionally, the determining, based on N, a minimum segment code length, and a maximum segment code length, a reserved segment quantity of each type of segments in segments of b−a+1 types of segment code lengths and a reserved code length corresponding to N includes if $N<p*2^{\wedge a}$, determining that a reserved segment quantity that corresponds to N and that is of segments whose segment code lengths are $2^{\wedge a}$ is $$\text{floor}\left(\frac{N}{2^{\wedge a}}\right),$$

and a reserved segment quantity that corresponds to N and that is of segments whose segment code lengths are $2^{\wedge j}$ is 0, where a<j≤b and p≥2; if $$p^* \sum_{i=a}^{c} 2^{\wedge i} \le N < p * \sum_{i=a}^{c+1} 2^{\wedge i},$$

determining that a reserved segment quantity that corresponds to N and that is of segments whose segment code lengths are $2^{\wedge j}$ is 0, a reserved segment quantity that corresponds to N and that is of segments whose segment code lengths are $2^{\wedge c+1}$ is $$\text{floor}\left(\frac{N - p * \sum_{i=a}^{c} 2^{\wedge i}}{2^{\wedge c+1}}\right),$$

and a reserved segment quantity that corresponds to N and that is of segments whose segment code lengths are $2^{\wedge v}$ is p, where a≤c≤b−1, a≤v≤c, and c+1<j≤b; or if $$p^* \sum_{i=a}^{b} 2^{\wedge i} \le N,$$

determining that the reserved segment quantity of each type of segments is p; and determining the reserved code length $N_{res}$ based on the reserved segment quantity of each type of segments, where $$N_{res} = \sum_{c=a}^{b} m_{c,N} * 2^{\wedge c},$$

and $m_{c,N}$ represents a reserved segment quantity that corresponds to N and that is of segments whose segment code lengths are $2^{\wedge c}$.

Relative to a receiving rate, when a reporting rate is considered substantially low, reporting of a last segment is not completed after a current segment is received. This causes an impact on the delay of decoding and reporting. In this embodiment, a value of p may be determined based on an implemented case. Relative to the receiving rate, a lower reporting rate indicates a larger value of p.

Through implementation of the solution provided in this embodiment, an adverse impact of a low reporting rate on the delay of decoding and reporting can be reduced.

A Bluetooth bandwidth is equal to $B_1$, a reporting bandwidth is equal to $B_2$, and a code rate is $R_0$. N corresponds to the S segments, and the segment code length of the $i^{th}$ segment and the segment code length of the $(i+1)^{th}$ segment in the S segments are $N_4$ and $N_5$. Receiving duration of the $(i+1)^{th}$ segment is $$\frac{N_5}{B_1},$$

and reporting duration of the $i^{th}$ segment is $$\frac{N_4 * R_0}{B_2}. \text{ If } \frac{N_4 * R_0}{B_2} > \frac{N_5}{B_1},$$

reporting of the $i^{th}$ segment is not ended after receiving of the $(i+1)^{th}$ segment is ended. Consequently, a start point of reporting of the $(i+1)^{th}$ segment is affected, and in this case, $$B_2 < \frac{N_4 * R_0}{N_5} * B_1.$$

Therefore, in the foregoing case, a final delay of decoding and reporting may be affected. In this disclosure, $N_4 \geq N_5$. To reduce an impact of reporting of the $i^{th}$ segment on reporting of the $(i+1)^{th}$ segment, $N_4 = N_5$ may be set. Therefore, in this embodiment, to reduce an impact of reporting of the $i^{th}$ segment on the delay of decoding and reporting, p segments are pre-reserved for segments of a same segment code length.

For example, the value of p is 2. If the minimum segment code length is 128, namely, $2^7$, and the maximum segment code length is 1024, namely, $2^{10}$, a reserved segment quantity of each type of segments in segments of four types of segment code lengths and the reserved code length corresponding to N are determined based on N, the minimum segment code length, and the maximum segment code length. This step includes determining, based on the minimum segment code length and the maximum segment code length, that the four types of segment code lengths are 1024, 512, 256, and 128, and determining the reserved segment quantity of each type of segments in the four types of segments and the reserved code length corresponding to N, as shown in Table 1.

TABLE 1

| N | $m_{10,N}$ | $m_{9,N}$ | $m_{8,N}$ | $m_{7,N}$ |
|---|---|---|---|---|
| N < 256 | 0 | 0 | 0 | $\text{floor}\left(\frac{N}{256}\right)$ |
| 256 ≤ N < 768 | 0 | 0 | $\text{floor}\left(\frac{N-256}{256}\right)$ | 2 |
| 768 ≤ N < 1792 | 0 | $\text{floor}\left(\frac{N-768}{512}\right)$ | 2 | 2 |
| 1792 ≤ N < 3840 | $\text{floor}\left(\frac{N-1792}{1024}\right)$ | 2 | 2 | 2 |
| 3840 ≤ N | 2 | 2 | 2 | 2 |

It may be understood that $m_{10,N}$ represents a reserved segment quantity of the segments whose segment code lengths are 1024, $m_{9,N}$ represents a reserved segment quantity of the segments whose segment code lengths are 512, $m_{8,N}$ represents a reserved segment quantity of the segments whose segment code lengths are 256, and $m_{7,N}$ represents a reserved segment quantity of the segments whose segment code lengths are 128. The value of p is 2. If N<256, the reserved code length corresponding to N is $$\text{floor}\left(\frac{N}{256}\right) * 2^7.$$

If 256≤N<768, the reserved code length corresponding to N is $p*2^7$, namely, 256. If 768≤N<1792, the reserved code length corresponding to N is $p*(2^7+2^8)$, namely, 768. If 1792≤N<3840, the reserved code length corresponding to N is $p*(2^7+2^8+2^9)$, namely, 1792. If 3840<N, the reserved code length corresponding to N is $p*(2^7+2^8+2^8+2^9)$, namely, 3840.

Examples in which the value of N is 1024, 2048, 3712, and 6144 are used for description. When the value of N is 1024, the reserved segment quantity corresponding to $m_{9,N}$ is $$\text{floor}\left(\frac{1024-768}{512}\right),$$

namely, 0, the reserved segment quantities of the four types of segments are 0, 0, 2, and 2, and the reserved code length corresponding to N is 768. When the value of N is 2048, the reserved segment quantity corresponding to $m_{10,N}$ is $$\text{floor}\left(\frac{2048-1792}{1024}\right),$$

namely, 0, the reserved segment quantities of the four types of segments are 0, 2, 2, and 2, and the reserved code length corresponding to N is 1792. When the value of N is 3712, the reserved segment quantity corresponding to $m_{10,N}$ is $$\text{floor}\left(\frac{3712-1792}{1024}\right),$$

namely, 1, the reserved segment quantities of the four types of segments are 1, 2, 2, and 2, and the reserved code length corresponding to N is 1920 When the value of N is 6144, the reserved segment quantity corresponding to $m_{10,N}$ is $$\text{floor}\left(\frac{6144-3840}{1024}\right),$$

namely, 2, the reserved segment quantities of the four types of segments are 2, 1, 1, and 1, and the reserved code length corresponding to N is 3840.

Optionally, the determining, based on N, a minimum segment code length, and a maximum segment code length, a reserved segment quantity of each type of segments in segments of b−a+1 types of segment code lengths and a reserved code length corresponding to N includes determining the b−a+1 types of segments based on the minimum segment code length and the maximum segment code length; if $N<2^{\wedge a}$, determining that the reserved segment quantity of each type of segments is 0; if $$\sum_{i=a}^{c} 2^{\wedge i} \leq N < \sum_{i=a}^{c+1} 2^{\wedge i},$$

determining that a reserved segment quantity of segments whose segment code lengths are $2^{\wedge j}$ is 0, and a reserved segment quantity of segments whose segment code lengths are $2^{\wedge v}$ is 1, where $a \leq c \leq b-1$, $a \leq v \leq c$, and $c < j \leq b$; or if $$\sum_{i=a}^{b} 2^{\wedge i} \leq N,$$

determining that the reserved segment quantity of each type of segments is 1; and determining the reserved code length $N_{res}$ based on the reserved segment quantity of each type of segments, where $$N_{res} = \sum_{c=a}^{b} m_{c,N} * 2^{\wedge c},$$

and $m_{c,N}$ represents a reserved segment quantity that corresponds to N and that is of segments whose segment code lengths are $$2^{\wedge c} \cdot \sum_{i=a}^{c} 2^{\wedge i}$$

indicates that superposition is performed on $2^{\wedge i}$ with i changes, and $a \leq i \leq c$.

It may be understood that the solution in this embodiment is a case in which the value of p is 1. In this embodiment, a plurality of segments may not be reserved for segments of a same segment code length. This solution is applicable to a case of $$B_2 \geq \frac{N_4 * R_0}{N_5} * B_1.$$

For example, if the minimum segment code length is 128, namely, $2^{\wedge 7}$, and the maximum segment code length is 1024, namely, $2^{\wedge 10}$, a reserved segment quantity of each type of segments in segments of four types of segment code lengths and the reserved code length corresponding to N are determined based on N, the minimum segment code length, and the maximum segment code length. This step includes determining, based on the minimum segment code length and the maximum segment code length, that the four types of segment code lengths are 1024, 512, 256, and 128, and determining the reserved segment quantity of each type of segments in the four types of segments and the reserved code length corresponding to N, as shown in Table 2.

TABLE 2

| N | $m_{10,N}$ | $m_{9,N}$ | $m_{8,N}$ | $m_{7,N}$ |
|---|---|---|---|---|
| N < 128 | 0 | 0 | 0 | 0 |
| 128 ≤ N < 384 | 0 | 0 | 0 | 1 |
| 384 ≤ 896 | 0 | 0 | 1 | 1 |
| 896 ≤ N < 1920 | 0 | 1 | 1 | 1 |
| 1920 ≤ N | 1 | 1 | 1 | 1 |

It may be understood that if N<128, the reserved code length corresponding to N is 0. If 128≤N<384, the reserved code length corresponding to N is $2^{\wedge 7}$. If 384≤N<896, the reserved code length corresponding to N is $2^{\wedge 7}+2^{\wedge 8}$, namely, 384. If 896≤N<1920, the reserved code length corresponding to N is $2^{\wedge 7}+2^{\wedge 8}+2^{\wedge 9}$, namely, 896. If 1920<N, the reserved code length corresponding to N is $2^{\wedge 7}+2^{\wedge 8}+2^{\wedge 8}+2^{\wedge 9}$, namely, 1920.

It can be learned from the foregoing example that in this embodiment, a certain quantity of segments may be pre-reserved for segments whose segment code lengths are considered short, and a sum of segment code lengths of the reserved segments is the reserved code length.

S503: Orderly determine a segment quantity of each type of segments based on N, the reserved code length, a segment code length of each type of segments, and the reserved segment quantity of each type of segments and based on the segment code lengths from the largest to the smallest, where a sum of segment quantities of types of segments is equal to S, N corresponds to S segments, and a segment code length of an $i^{th}$ segment in the S segments is greater than or equal to a segment code length of an $(i+1)^{th}$ segment in the S segments.

Optionally, the orderly determining a segment quantity of each type of segments based on N, the reserved code length, a segment code length of each type of segments, and the reserved segment quantity of each type of segments and based on the segment code lengths from the largest to the smallest includes orderly determining a remaining segment quantity of each type of segments based on N, the reserved code length, and the segment code length of each type of segments and based on the segment code lengths from the largest to the smallest, where the remaining segment quantity of each type of segments is a remaining segment quantity of each type of segments corresponding to a remaining code length that is obtained by subtracting the reserved code length from N, and determining the segment quantity of each type of segments based on the reserved segment quantity of each type of segments and the remaining segment quantity of each type of segments.

In this embodiment, the remaining code length obtained by subtracting the reserved code length from N is segmented again. The orderly determining a remaining segment quantity of each type of segments based on the segment code lengths from the largest to the smallest is by preferentially allocating the remaining code length to a segment type whose segment code length is large.

It may be understood that a smaller segment quantity indicates improved system performance. In an optional embodiment of step S503, to meet the delay limit of decoding and reporting, a quantity of segments is first reserved for a segment type whose segment code length is considered small. When the delay limit of decoding and reporting is met, in this embodiment, the remaining code length is preferentially allocated to the segment type whose segment code length is considered large, so that a total segment quantity is as small as possible, even if S is as small as possible.

Optionally, the orderly determining a remaining segment quantity of each type of segments based on N, the reserved code length, and the segment code length of each type of segments and based on the segment code lengths from the largest to the smallest includes if $N<2^{\wedge a}$, determining that a remaining segment quantity $z_{c,N}$ that corresponds to N and that is of the segments whose segment code lengths are $2^{\wedge c}$ is 0, and a remaining segment quantity $z_{a,N}$ that corresponds to N and that is of the segments whose segment code lengths are $2^{\wedge a}$ is 1, where $a<c\leq b$; or if $N\geq 2^{\wedge a}$, orderly determining the remaining segment quantity of each type of segments based on the segment code lengths from the largest to the smallest, and determining that a remaining segment quantity $z_{b,N}$ that corresponds to N and that is of segments whose segment code lengths are $2^{\wedge b}$ is $$\text{floor}\left(\frac{N - N_{res}}{2^{\wedge b}}\right),$$

and a remaining segment quantity $z_{c,N}$ that corresponds to N and that is of the segments whose segment code lengths are $2^{\wedge c}$ is $$\text{floor}\left(\frac{N - N_{res} - \sum_{e=c+1}^{b} z_{e,N} * 2^{\wedge e}}{2^{\wedge c}}\right),$$

where $a\leq c<b$, and floor(x) represents rounding down x.

For example, if the minimum segment code length is 128, namely, $2^{\wedge 7}$, and the maximum segment code length is 1024, namely, $2^{\wedge 10}$, it is determined, based on the minimum segment code length and the maximum segment code length, that the four types of segment code lengths are 1024, 512, 256, and 128. Examples in which the value of N is 1024, 2048, 2560, and 6144 are used for description. When the value of N is 1024, the reserved segment quantities of the four types of segments are 0, 1, 1, and 1, the reserved code length corresponding to N is 896, and the remaining code length is 128, When the value of N is 2048, the reserved segment quantities of the four types of segments are 1, 1, 1, and 1, the reserved code length corresponding to N is 1920, and the remaining code length is 128. When the value of N is 2560, the reserved segment quantities of the four types of segments are 1, 1, 1, and 1, the reserved code length corresponding to N is 1920, and the remaining code length is 640. When the value of N is 6144, the reserved segment quantities of the four types of segments are 1, 1, 1, and 1, the reserved code length corresponding to N is 1920, and the remaining code length is 4224. When the value of N is 1024, 2560, and 6144, corresponding remaining segment quantities of the four types of segments are shown in Table 3.

TABLE 3

| N | Remaining code length | $z_{10,N}$ | $z_{9,N}$ | $z_{8,N}$ | $z_{7,N}$ |
|---|---|---|---|---|---|
| 1024 | 128 | 0 | 0 | 0 | 1 |
| 2048 | 128 | 0 | 0 | 0 | 1 |
| 2560 | 640 | 0 | 1 | 0 | 1 |
| 6144 | 4224 | 4 | 0 | 0 | 1 |

It may be understood that $z_{10,N}$ represents a reserved segment quantity of the segments whose segment code lengths are 1024, $z_{9,N}$ represents a reserved segment quantity of the segments whose segment code lengths are 512, $z_{8,N}$ represents a reserved segment quantity of the segments whose segment code lengths are 256, and $z_{7,N}$ represents a reserved segment quantity of the segments whose segment code lengths are 128. It can be learned from the foregoing example that in this embodiment, a remaining segment quantity can be first allocated to a segment type whose segment code length is large.

Optionally, the determining the segment quantity of each type of segments based on the reserved segment quantity of each type of segments and the remaining segment quantity of each type of segments includes determining a segment quantity $M_{c,N}$ that corresponds to N and that is of the segments whose segment code lengths are $2^{\wedge c}$, where $M_{c,N}=m_{c,N}+z_{c,N}$, and $a\leq c\leq b$.

It may be understood that the segment quantity of the segments whose segment code lengths are $2^{\wedge c}$ is equal to a reserved segment quantity of the segments whose segment code lengths are $2^{\wedge c}$ plus a remaining segment quantity of the segments whose segment code lengths are $2^{\wedge c}$.

For example, if the minimum segment code length is 128, and the maximum segment code length is 1024, it is determined, based on the minimum segment code length and the maximum segment code length, that the four types of segment code lengths are 1024, 512, 256, and 128. When the value of N is 2048, the reserved segment quantities that correspond to N and that are of the four types of segments are 1, 1, 1, and 1, and the remaining segment quantities that correspond to N and that are of the four types of segments are 0, 0, 0, and 1. Therefore, segment quantities that correspond to N and that are of the four types of segments are 1, 1, 1, and 2.

S504: Determine a target information bit length of each segment based on the code rate and a segment code length of each segment in the S segments.

Optionally, the determining a target information bit length of each segment based on the code rate and a segment code length of each segment in the S segments includes determining that a target information bit length of a segment whose segment code length is $2^{\wedge c}$ in the S segments is ceil($2^{\wedge c}*R$).

It may be understood that in this embodiment, segment code rates of the S segments almost equal, and a segment code rate of a segment equal to a target information bit length of the segment or a segment code length of the segment. In this embodiment, the target information bit length of each segment is determined based on the code rate R and the segment code length of each segment. To ensure that the target information bit length of the segment is a positive integer, $(2^{\wedge c}*R)$ is rounded up. Therefore, a sum of target information bit lengths of the S segments is greater than or equal to the length $K_0$ of the to-be-encoded information bits.

In a same channel environment and a same segment code rate, a larger segment code length of a segment indicates a lower packet error rate and better performance. Therefore, a segment with a larger segment code length in the S segments has better performance.

Optionally, a difference between the sum of the target information bit lengths of the S segments and the length of the to-be-encoded information bits is $k_0$, and $$k_0 = \sum_{c=a}^{b} M_{c,N}{}^* \text{ceil}(2^{\wedge c*}R) - K_0.$$

To ensure that the sum of the target information bit lengths of the S segments is equal to the length of the to-be-encoded information bits, the determining a target information bit length of each segment based on the code rate and a segment code length of each segment in the S segments includes when the segment code length of the $i^{th}$ segment in the S segments is $2^{\wedge e}$, determining that a target information bit length of the $i^{th}$ segment is $\text{ceil}(2^{\wedge e*}R)-k_0$, and a target information bit length of a segment that is in segments other than the $i^{th}$ segment in the S segments and whose segment code length is $2^{\wedge c}$ is $\text{ceil}(2^{\wedge c*}R)$, where $1 \leq i \leq S$, i may be equal to 1, equal to S, or equal to another predetermined value. This is not limited in this embodiment.

Optionally, if the $i^{th}$ segment in the S segments is an $S^{th}$ segment in the S segments, the determining a target information bit length of each segment based on the code rate and a segment code length of each segment in the S segments includes if $$\sum_{c=a}^{b} M_{c,N}{}^* \text{ceil}(2^{\wedge c*}R) = K_0,$$

determining that a target information bit length of a segment whose segment code length is $2^{\wedge c}$ is $\text{ceil}(2^{\wedge c*}R)$, where $a \leq c \leq b$; or if $$\sum_{c=a}^{b} M_{c,N}{}^* \text{ceil}(2^{\wedge c*}R) > K_0,$$

determining that a target information bit length of a segment whose segment code length is $2^{\wedge c}$ is $\text{ceil}(2^{\wedge c*}R)$, target information bit lengths that correspond to N and that are of the first $M_{a,N}-1$ segments in $M_{a,N}$ segments whose segment code lengths are $2^{\wedge a}$ are $\text{ceil}(2^{\wedge a*}R)$, and a target information bit length of an $(M_{a,N})^{th}$ segment in the $M_{a,N}$ segment is $$K_0 - \sum_{c=a+1}^{b} M_{c,N}{}^* \text{ceil}(2^{\wedge c*}R) + (M_{a,N} - 1)^* \text{ceil}(2^{\wedge a*}R),$$

where the $(M_{a,N})^{th}$ segment is an $S^{th}$ segment in the S segments, and $a<c \leq b$.

Optionally, the determining a target information bit length of each segment based on the code rate and a segment code length of each segment in the S segments includes determining a reference information bit length of each segment, and determining the target information bit length of each segment based on the reference information bit length of each segment and the segment quantity of each type of segments.

In this embodiment, the reference information bit length of each segment is determined first, and then the target information bit length of each segment is adjusted based on the reference information bit length and an actual requirement.

Optionally, the reference information bit length of the segment whose segment code length is $2^{\wedge c}$ in the S segments is $\text{ceil}(2^{\wedge c*}R)$.

Optionally, the determining a target information bit length of each segment based on the code rate and a segment code length of each segment in the S segments includes if $$\sum_{c=a}^{b} M_{c,N}{}^* \text{ceil}(2^{\wedge c*}R) = K_0,$$

determining that a reference information bit length that corresponds to N and that is of a segment whose segment code length is $2^{\wedge c}$ is $\text{ceil}(2^{\wedge c*}R)$ where $a \leq c \leq b$; or if $$\sum_{c=a}^{b} M_{c,N}{}^* \text{ceil}(2^{\wedge c*}R) > K_0,$$

determining that a reference information bit length that corresponds to N and that is of a segment whose segment code length is $2^{\wedge c}$ is $\text{ceil}(2^{\wedge c*}R)$, reference information bit lengths of the first $M_{a,N}-1$ segments in $M_{a,N}$ segments are $\text{ceil}(2^{\wedge a*}R)$, and a reference information bit length of an $(M_{a,N})^{th}$ segment in the $M_{a,N}$ segments is $$K_0 - \sum_{c=a+1}^{b} M_{c,N}{}^* \text{ceil}(2^{\wedge c*}R) + (M_{a,N} - 1)^* \text{ceil}(2^{\wedge a*}R),$$

where the $(M_{a,N})^{th}$ segment is an $S^{th}$ segment in the S segments, and $a<c \leq b$; and determining the target information bit length of each segment based on the reference information bit length of each segment and the segment quantity of each type of segments.

Optionally, the determining the target information bit length of each segment based on the reference information bit length of each segment and the segment quantity of each type of segments includes determining the target information bit length of each segment according to an allocation principle. The allocation principle is that on the basis of the reference information bit length of each segment, a first information bit length is added to f segments whose segment code lengths are the largest in the S segments, h segments whose segment code lengths are not the largest in the S segments are reduced by the first information bit length, a segment with a smaller segment code length in the segments whose segment code lengths are not the largest has a smaller segment code rate, and a sum of target information bit lengths of the S segments is $K_0$, where f and h are positive integers.

A segment with a larger segment code length has improved performance in a case of a same segment code rate. In this embodiment, based on the reference information bit length, the target information bit length of each segment is adjusted, so that segment code rates of the segments whose segment code lengths are the largest in the S segments are increased, and segment code rates of the segments whose segment code lengths are not the largest in the S segments are decreased, thereby improving system performance of the segments whose segment code lengths are the largest, degrading system performance of the segments whose segment code lengths are not the largest, and implementing improvement of system performance. In addition, the segments whose segment code lengths are not the largest are segments of packet trailers of the S segments, and a segment having a smaller segment code length is more backward. Therefore, information bit lengths of the segments whose segment code lengths are not the largest may be adjusted, so that a segment with a smaller segment code length in the segments whose segment code lengths are not the largest has a smaller segment code rate. This improves system performance, and can further reduce the delay of decoding and reporting.

Optionally, the determining the target information bit length of each segment based on the reference information bit length of each segment and the segment quantity of each type of segments includes determining a target information bit length of a first segment, where the target information bit length of the first segment is equal to a reference information bit length of the first segment plus a second information bit length, and the first segment is a segment whose segment code length is the largest in the S segments, and determining a target information bit length of a second segment, where the target information bit length of the second segment is equal to a reference information bit length of the second segment minus a third information bit length, and the second segment is a segment whose segment code length is not the largest in the S segments. In the S segments, h segments whose segment code lengths are not the largest are reduced by f times of the second information bit length, and a segment with a smaller segment code length in the segments whose segment code lengths are not the largest has a smaller segment code rate, where a sum of target information bit lengths of the S segments is $K_0$, f is a segment quantity of segments whose segment code lengths are the largest in the S segments, and h is a positive integer greater than or equal to 0.

Optionally, the determining the target information bit length of each segment based on the reference information bit length of each segment and the segment quantity of each type of segments includes if a segment code length of a segment whose segment code length is the largest in the S segments is $2^{\wedge a}$, determining that a target information bit length of the segment whose segment code length is $2^{\wedge a}$ is equal to a reference information bit length of the segment whose segment code length is $2^{\wedge a}$; or if a segment code length of a segment whose segment code length is the largest in the S segments is $2^{\wedge r}$, determining that a target information bit length of the segment whose segment code length is $2^{\wedge r}$ is a reference information bit length of the segment whose segment code length is $2^{\wedge r}$ plus $$\sum_{c=a}^{r-1} \partial_c * M_{c,N},$$

and a target information bit length of a segment whose segment code length is $2^{\wedge c}$ is a reference information bit length of the segment whose segment code length is $2^{\wedge c}$ minus $\partial_c * M_{r,N}$, where a≤c<r, $\partial_c$ is a proportion parameter, and $\partial_c$ is a positive integer.

Optionally, $0 < \partial_{c+1} \leq 2\partial_c$, so that the segment code rates of the segments whose segment code lengths are not the largest are in a decreasing trend.

For example, if the minimum segment code length is 128, and the maximum segment code length is 1024, it is determined, based on the minimum segment code length and the maximum segment code length, that the four types of segment code lengths are 1024, 512, 256, and 128. The value of N is 2048, the value of $K_0$ is 1024, and the code rate is 0.5. It can be learned from derivation of the solution in this embodiment that the segment quantities that correspond to N and that are of the four types of segments are 1, 1, 1, and 2. It is assumed that values of $\partial_7$, $\partial_8$, and $\partial_9$ are 2, 4, and 6. In this case, information bit lengths of the segments whose segment code lengths are 1024 are 526, information bit lengths of the segments whose segment code lengths are 512 are 250, information bit lengths of the segments whose segment code lengths are 256 are 124, and information bit lengths of the segments whose segment code lengths are 128 are 26. Segment code rates of the four types of segments are 0.5137, 0.4883, 0.4844, 0.4844, and 0.4844. Therefore, it can be learned that the segment code lengths of the four types of segments are in a decreasing trend, and the segment code rates of the four types of segments are also in a decreasing trend.

Figure 6:
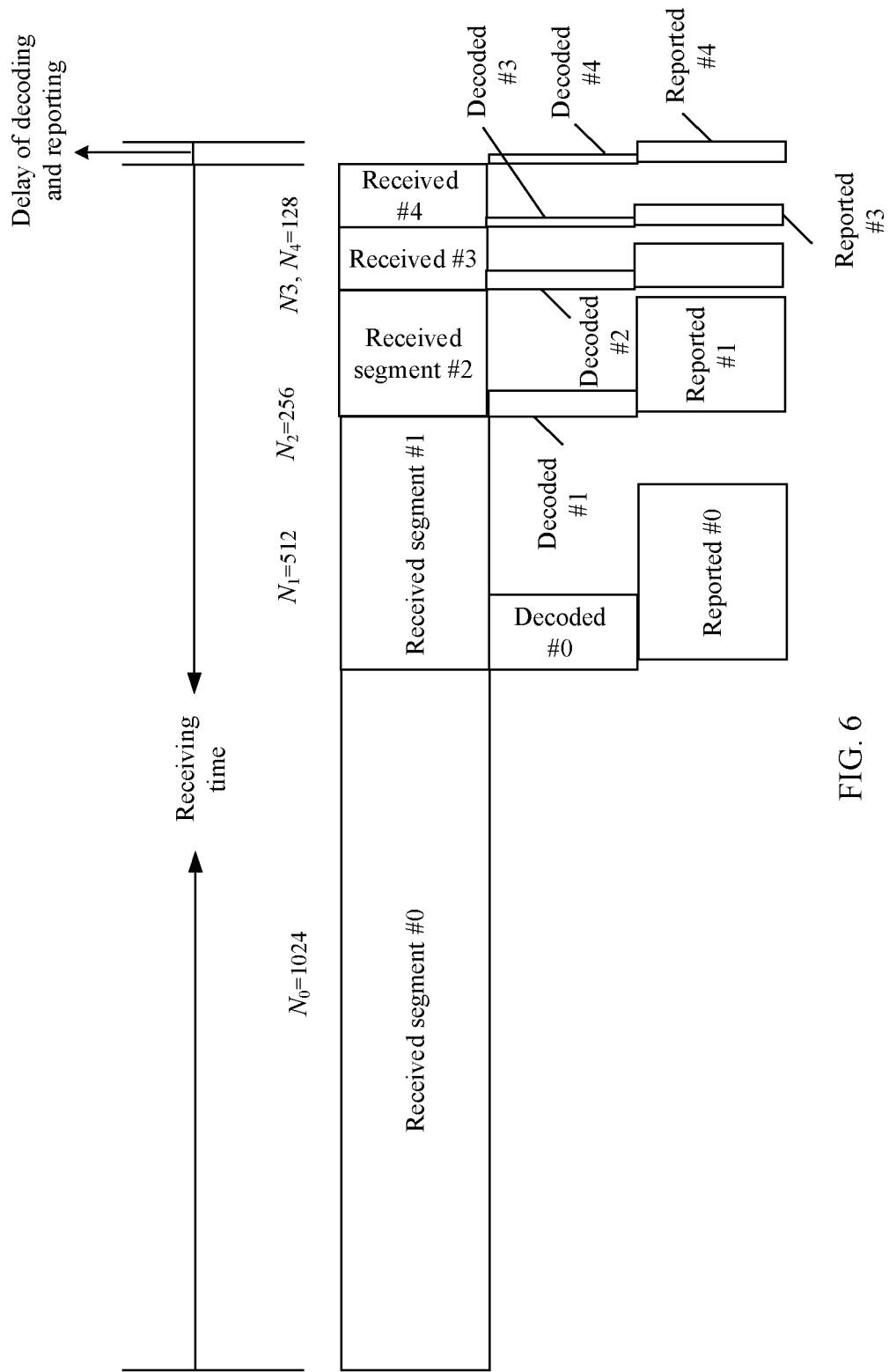
FIG. 6 is a schematic diagram of another delay of decoding and reporting according to an embodiment.

Based on the foregoing example, FIG. 6 is a schematic diagram of a delay of decoding and reporting according to an embodiment. If a reporting bandwidth is equal to 8 Mb/s, a reporting delay of a last segment is equal to 3.25 μs. Because a time difference of decoding and reporting of the last segment may be ignored, the delay of decoding and reporting is approximately equal to 3.25 μs, which meets the 15 μs delay limit of decoding and reporting.

Based on the foregoing example, the value of $K_0$ is 1024, and the code rate is 0.5. Under same network parameters, segmentation is performed based on the first segmentation manner, a to-be-encoded information sequence is divided into two parts, an information bit length of a second segment is 512, and a segment code length is 1024. The delay of decoding and reporting is approximately equal to 64 μs, which far exceeds the 15 μs delay limit of decoding and reporting. Under same network parameters, segmentation is performed based on the first segmentation manner, a to-be-encoded information sequence is divided into two parts, a segment code length of a second segment is 1024, and an information bit length is 512. The delay of decoding and reporting is also approximately equal to 64 μs, which far exceeds the 15 μs delay limit of decoding and reporting.

Based on the foregoing analysis, the solution proposed in this embodiment can greatly optimize the delay of decoding and reporting.

In this embodiment, when the segment quantities $M_{b,N}$ of the segments whose segment code lengths are the largest are large, an information bit length added for the segments whose segment code lengths are the largest in the S segments is excessively large. In addition, the information bit length reduced for the segments whose segment code lengths are not the largest in the S segments is excessively large.

Optionally, to resolve the foregoing problem, if $M_{b,N} > T$, and T is a positive integer, the determining the target information bit length of each segment based on the reference information bit length of each segment and the segment quantity of each type of segments includes determining that target information bit lengths of the first T segments in $M_{b,N}$ segments whose segment code lengths are $2^{\wedge b}$ are a reference information bit length of the segment whose segment code length is $2^{\wedge b}$ plus $$\sum_{c=a}^{b-1} \partial_c {}^* M_{c,N},$$

target information bit lengths of the last $M_{b,N}$–T segments in the $M_{b,N}$ segments are equal to the reference information bit length of the segment whose segment code length is $2^{\wedge b}$, and a target information bit length of a segment whose segment code length is $2^{\wedge c}$ is a reference information bit length of the segment whose segment code length is $2^{\wedge c}$ minus $\partial_c {}^*$T, where a≤c<b, $\partial_c$ is a positive integer, and $\partial_{c+1} > \partial_c$.

To resolve the foregoing problem, in this embodiment, information bits are added for the first T segments in the $M_{b,N}$ segments whose segment code lengths are $2^{\wedge b}$, and the information bit length is properly reduced, with T as a reference amount, for the segments whose segment code lengths are not the largest. In this embodiment, segment code rates of the first T segments are greater than segment code rates of the last $M_{b,N}$–T segments.

S505: Perform polar code encoding on the to-be-encoded information bits based on the target information bit length of each segment.

Optionally, the performing polar code encoding on the to-be-encoded information bits based on the target information bit length of each segment includes orderly allocating the to-be-encoded information bits to the S segments based on the target information bit length of each segment, and performing polar code encoding on information bits of each segment.

Optionally, the performing polar code encoding on the to-be-encoded information bits based on the target information bit length of each segment includes if $$\sum_{c=a}^{b} M_{c,N} {}^* \text{ceil}(2^{\wedge c} {}^* R) > K_0,$$

orderly allocating the to-be-encoded information bits to the S segments based on the target information bit length of each segment, and performing polar code encoding on information bits of each segment; or if $$\sum_{c=a}^{b} M_{c,N} {}^* \text{ceil}(2^{\wedge c} {}^* R) > K_0,$$

performing zero-padding on to-be-encoded information bits whose information bit length is $K_0$, where the information bit length of the to-be-encoded information bits after zero-padding is $$\sum_{c=a}^{b} M_{c,N} {}^* \text{ceil}(2^{\wedge c} {}^* R),$$

orderly allocating the to-be-encoded information bits after zero-padding to the S segments based on the target information bit length of each segment, and performing polar code encoding on information bits of each segment.

It may be understood that in this embodiment, a round up operation is used in a process of determining the target information bit length of each segment, so that the sum of the target information bit lengths of the S segments corresponding to N is greater than the length of the to-be-encoded information bits. In this embodiment, through a zero-padding operation, the length of the to-be-encoded information bits after zero-padding is equal to the sum of the target information bit lengths of the S segments. This helps subsequently perform polar code encoding on each segment.

Optionally, the performing zero-padding on to-be-encoded information bits whose information bit length is $K_0$ includes performing zero-padding at a preset location in the to-be-encoded information bits whose information bit length is $K_0$.

Optionally, zero-padding is performed at a front end of the to-be-encoded information bits whose information bit length is $K_0$, or zero-padding is performed at a tail end of the to-be-encoded information bits whose information bit length is $K_0$.

In this embodiment, the segments of the b−a+1 types of segment code lengths are determined based on the minimum segment code length and the maximum segment code length, the value of the minimum segment code length is $2^{\wedge a}$, and the value of the maximum segment code length is $2^{\wedge b}$; and the code length N after encoding is divided into the S segments based on the minimum segment code length and the b−a+1 types of segment code lengths of the segments, the segment code length of the $i^{th}$ segment in the S segments is greater than or equal to the segment code length of the $(i+1)^{th}$ segment in the S segments, and the to-be-encoded information bits are allocated to the S segments for polar code encoding. In the proposed solution, rate matching is not performed, so that overheads brought by rate matching are avoided. In addition, segment code lengths of segments of a packet trailer of a data packet after segmentation are in a decreasing trend. This can improve performance of a low-power communication system when a low delay requirement is met. In addition, in this embodiment, based on the reference information bit length, the target information bit length of each segment is adjusted, so that the segment code rates of the segments whose segment code lengths are the largest in the S segments are increased, and the segment code rates of the segments whose segment code lengths are not the largest in the S segments are decreased, thereby improving the system performance. In addition, the information bit lengths of the segments whose segment code lengths are not the largest are adjusted, so that a segment with a smaller segment code length in the segments whose segment code lengths are not the largest has a smaller segment code rate. This improves the system performance, can further reduce the delay of decoding and reporting, matches an existing communication system, and reduces modifications to the existing system.

Figure 7:
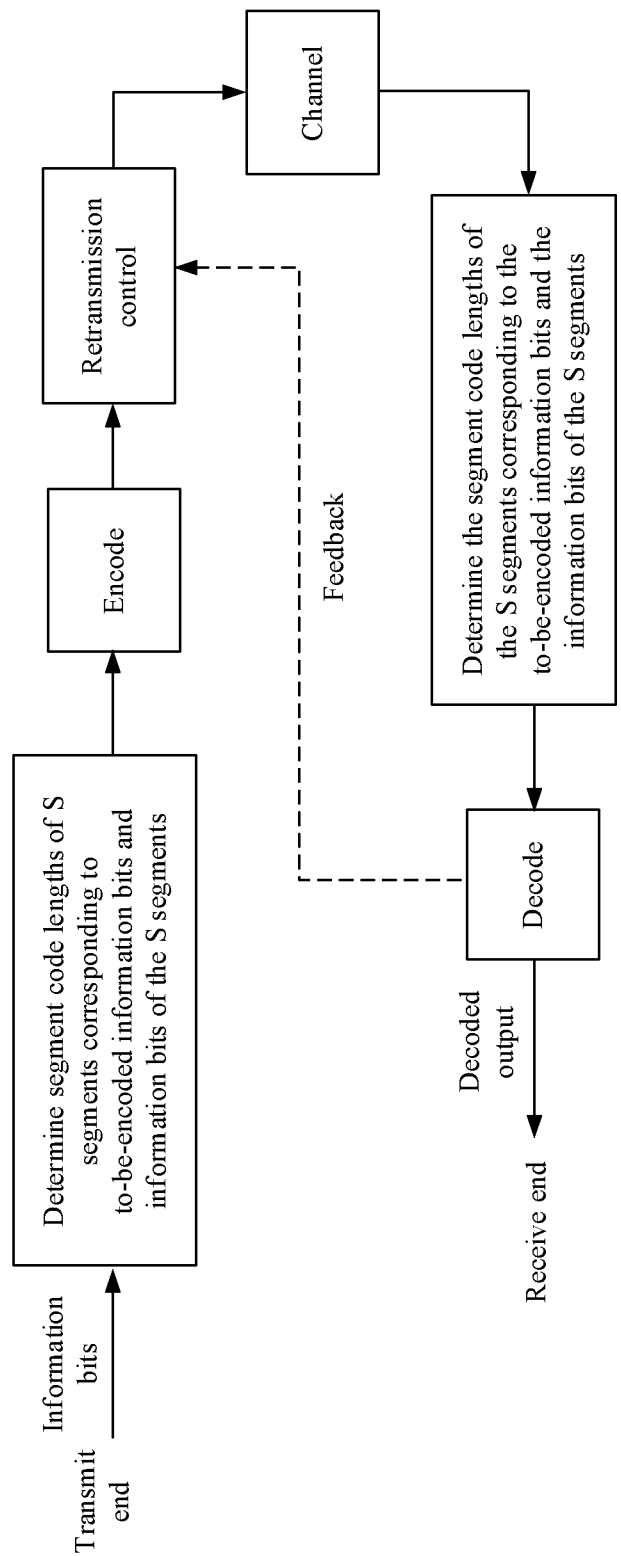
FIG. 7 is a schematic diagram of a principle of polar code segment encoding and segment decoding according to an embodiment.

FIG. 7 is a schematic diagram of a principle of polar code segment encoding and segment decoding according to an embodiment. A transmit end determines, according to the polar code segment encoding method provided in the embodiments, segment code lengths of S segments corresponding to to-be-encoded information bits and information bits of the S segments, and performs polar code segment encoding based on the segment code lengths of the S segments and the information bits of the S segments. A receive end determines, according to the polar code segment encoding method provided in the embodiments, the segment code lengths of the S segments corresponding to the to-be-encoded information bits and the information bits of the S segments. After receiving data, the receive end performs polar code segment decoding based on the segment code lengths of the S segments and the information bits of the S segments. After decoding, whether the received data is correct is determined through check. If the received data is correct, ACK information is replied to the transmit end, to inform the transmit end that this time of receiving is correct. If the CRC check fails, the receive end considers that the data received this time is incorrect, and the receive end feeds back or replies negative acknowledgment (NACK) information to the transmit end, to inform the transmit end that this time of receiving is incorrect, so that the transmit end performs retransmission. After receiving retransmitted information, the receive end continuously performs polar code segment decoding, and check whether retransmitted data is correct. The transmit end may be the terminal device 101 or the Bluetooth headset 102 shown in the Bluetooth communication system in FIG. 1. The receive end may be the terminal device 101 or the Bluetooth headset 102 shown in the Bluetooth communication system in FIG. 1.

Figure 8:
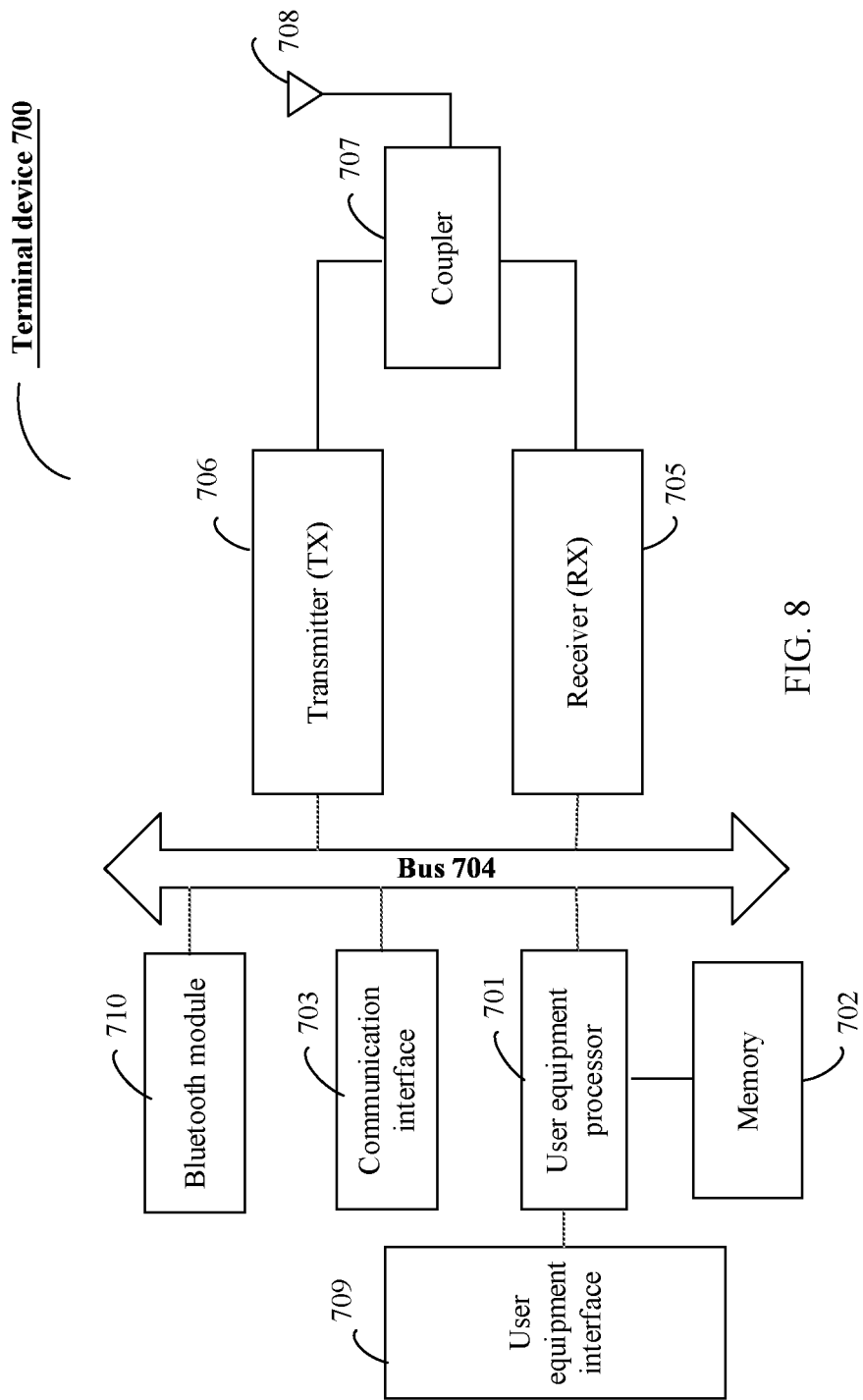
FIG. 8 is a schematic diagram of a structure of a terminal device according to an embodiment.

FIG. 8 shows a terminal device 700 according to an embodiment. As shown in FIG. 8, the terminal device 700 may include one or more terminal device processors 701, a memory 702, a communication interface 703, a receiver 705, a transmitter 706, a coupler 707, an antenna 708, a terminal device interface 709, and a Bluetooth module 710. These components may be connected through a bus 704 or in another manner. In FIG. 8, an example in which the components are connected through the bus is used.

The communication interface 703 may be configured to perform communication between the terminal device 700 and another communication device, for example, a network device. The network device may be the network device 700 shown in FIG. 8. The communication interface 703 may be a 5G communication interface, or may be a communication interface of future new radio. In addition to a wireless communication interface, a wired communication interface 703 may be further configured for the terminal device 700, for example, a local access network (LAN) interface. The transmitter 706 may be configured to transmit a signal output by the terminal device processor 701. The receiver 705 may be configured to receive a mobile communication signal received by the antenna 708.

In some embodiments, the transmitter 706 and the receiver 705 may be considered as a wireless modem. In the terminal device 700, there may be one or more transmitters 706 and receivers 705. The antenna 708 may be configured to convert electromagnetic energy in a transmission line into an electromagnetic wave in free space, or convert an electromagnetic wave in free space into electromagnetic energy in a transmission line. The coupler 707 is configured to divide the mobile communication signal received by the antenna 708 into a plurality of channels, and allocate the plurality of channels of signals to the plurality of receivers 705.

In addition to the transmitter 706 and the receiver 705 shown in FIG. 8, the terminal device 700 may further include another communication component, for example, a GPS module or a wireless fidelity (Wi-Fi) module. In addition to wireless communication, a wired network interface (for example, a LAN interface) may be further configured for the terminal device 700, to support wired communication.

The terminal device 700 may further include input/output modules. The input/output modules may be configured to implement interaction between the terminal device 700 and a terminal device or an external environment, and may include an audio input/output module, a key input module, a display, and the like. The input/output module may further include a camera, a touchscreen, a sensor, and the like. The input/output modules communicate with the terminal device processor 701 through the terminal device interface 709.

The memory 702 is coupled to the terminal device processor 701, and is configured to store various software programs and/or a plurality of groups of instructions. The memory 702 may include a high-speed random access memory (RAM), and may also include a nonvolatile memory, for example, one or more magnetic disk storage devices, a flash memory device, or another nonvolatile solid-state storage device. The memory 702 may store an operating system (referred to as a system for short below), for example, an embedded operating system such as Android, iOS, Windows, or Linux. The memory 702 may further store a network communication program. The network communication program may be used to communicate with one or more additional devices, one or more terminal devices, and one or more network devices.

In some embodiments, the memory 702 may be configured to store an implementation program of the polar code segment encoding method provided in one or more embodiments on the terminal device 700 side. For implementation of the polar code segment encoding method provided in one or more embodiments, refer to the foregoing embodiments.

The terminal device processor 701 may be configured to read computer-readable instructions and execute the computer-readable instructions. The terminal device processor 701 may be configured to call a program stored in the memory 702, for example, the implementation program of the polar code segment encoding method provided in one or more embodiments on the terminal device 700 side, and execute instructions included in the program.

It may be understood that the terminal device 700 may be the terminal device 101 in the communication system 100 shown in FIG. 1, and may be implemented as a handheld device, a vehicle-mounted device, a wearable device, a computing device, user equipment in various forms, a mobile station (MS), a terminal, or the like.

The terminal device 700 shown in FIG. 8 is merely an implementation of the embodiments, the terminal device 700 may further include more or fewer components. This is not limited herein.

Figure 9:
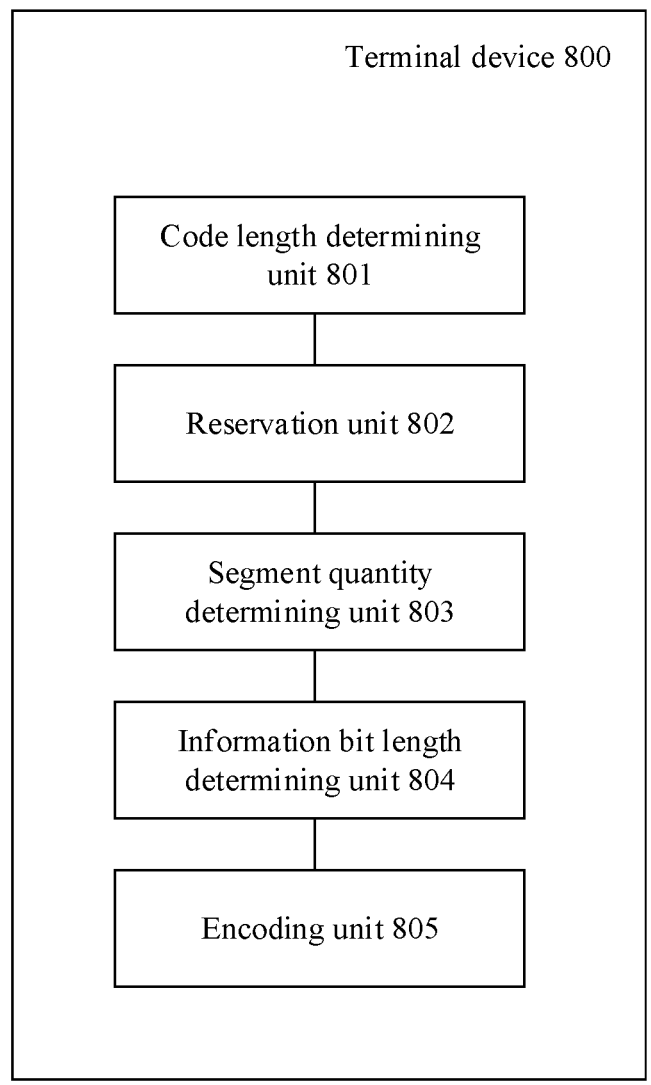
FIG. 9 is a schematic diagram of a structure of a polar code segment encoding apparatus according to an embodiment.

FIG. 9 shows a schematic diagram of a structure of a polar code segment encoding apparatus according to an embodiment. The polar code segment encoding apparatus 80 may also be the terminal device 101 or the Bluetooth headset 102 in FIG. 1. The polar code segment encoding apparatus 80 may include a code length determining unit 801, a reservation unit 802, a segment quantity determining unit 803, an information bit length determining unit 804, and an encoding unit 805.

The code length determining unit 801 is configured to determine, based on a length of to-be-encoded information bits and a code rate, a code length N after encoding, where N is a positive integer.

The reservation unit 802 is configured to determine, based on N, a minimum segment code length, and a maximum segment code length, a reserved segment quantity of each type of segments in segments of b−a+1 types of segment code lengths and a reserved code length corresponding to N, where a value of the minimum segment code length is $2^a$, a value of the maximum segment code length is $2^{\wedge b}$, the b−a+1 types of segment code lengths of the segments are $2^{\wedge c}$, a, b, and c are positive integers, a<b, and a≤c≤b.

The segment quantity determining unit 803 is configured to orderly determine a segment quantity of each type of segments based on N, the reserved code length, a segment code length of each type of segments, and the reserved segment quantity of each type of segments and based on the segment code lengths from the largest to the smallest, where a sum of segment quantities of types of segments is equal to S, N corresponds to S segments, and a segment code length of an $i^{th}$ segment in the S segments is greater than or equal to a segment code length of an $(i+1)^{th}$ segment in the S segments.

The information bit length determining unit 804 is configured to determine a target information bit length of each segment based on the code rate and a segment code length of each segment in the S segments.

The encoding unit 805 is configured to perform polar code encoding on the to-be-encoded information bits based on the target information bit length of each segment.

Optionally, the code length determining unit 801 is specifically configured to: determine a theoretical code length L based on the length $K_0$ of the to-be-encoded information bits and the code rate R, where a value of the theoretical code length is ceil($K_0$/R), and ceil(x) represents rounding up x; and determine N based on the theoretical code length and the minimum segment code length $2^{\wedge a}$, where a value of N is ceil(L/$2^{\wedge a}$)*$2^{\wedge a}$.

Optionally, the reservation unit 802 is configured to determine the segments of the b−a+1 types of segment code lengths based on the minimum segment code length and the maximum segment code length, where the value of the minimum segment code length is $2^{\wedge a}$, the value of the maximum segment code length is $2^{\wedge b}$, the b−a+1 types of segment code lengths of the segments are $2^{\wedge c}$, a, b, and c are positive integers, a<b, and a≤c≤b; orderly determine a reserved segment quantity of an $i^{th}$ type of segments in the b−a+1 types of segments based on the b−a+1 types of segment code lengths of the segments from the smallest to the largest and based on N and the segment code length of each type of segments in the b−a+1 types of segments, where the reserved segment quantity of the $i^{th}$ type of segments is greater than or equal to a reserved segment quantity of an $(i+1)^{th}$ type of segments in the b−a+1 types of segments; and determine the reserved code length corresponding to N based on the reserved segment quantity of each type of segments and the segment code length of each type of segments.

Optionally, the reservation unit 802 is configured to if N<p*$2^{\wedge a}$, determine that a reserved segment quantity that corresponds to N and that is of segments whose segment code lengths are $2^{\wedge a}$ is $$\text{floor}\left(\frac{N}{2^{\wedge a}}\right),$$

and a reserved segment quantity that corresponds to N and that is of segments whose segment code lengths are $2^{\wedge j}$ is 0, where a<j≤b, and p≥2; if $$p^*\sum_{i=a}^{c} 2^{\wedge i} \le N < p^*\sum_{i=a}^{c+1} 2^{\wedge i},$$

determine that a reserved segment quantity that corresponds to N and that is of segments whose segment code lengths are $2^{\wedge j}$ is 0, a reserved segment quantity that corresponds to N and that is of segments whose segment code lengths are $2^{\wedge c+1}$ is $$\text{floor}\left(\frac{N - p^*\sum_{i=1}^{c} 2^{\wedge i}}{2^{\wedge c+1}}\right),$$

and a reserved segment quantity that corresponds to N and that is of segments whose segment code lengths are $2^{\wedge v}$ is p, where a≤c≤b−1, a≤v≤c, and c+1<j≤b; or if $$p^*\sum_{i=a}^{b} 2^{\wedge i} \le N,$$

determine that the reserved segment quantity of each type of segments is p; and determine the reserved code length $N_{res}$ based on the reserved segment quantity of each type of segments, where $$N_{res} = \sum_{c=a}^{b} m_{c,N}^* 2^{\wedge c},$$

and $m_{c,N}$ represents a reserved segment quantity that corresponds to N and that is of segments whose segment code lengths are $2^{\wedge c}$.

Optionally, the reservation unit 802 is configured to if N<$2^{\wedge a}$, determine that the reserved segment quantity of each type of segments is 0; if $$\sum_{i=a}^{c} 2^{\wedge i} \le N < \sum_{i=a}^{c+1} 2^{\wedge i},$$

determine that a reserved segment quantity of segments whose segment code lengths are $2^{\wedge j}$ is 0, and a reserved segment quantity of segments whose segment code lengths are $2^{\wedge v}$ is 1, where a≤c≤b−1, a≤v≤c, and c<j≤b; or if $$\sum_{i=a}^{b} 2^{\wedge i} \le N,$$

determine that the reserved segment quantity of each type of segments is 1; and determine the reserved code length $N_{res}$ based on the reserved segment quantity of each type of segments, where $$N_{res} = \sum_{c=a}^{b} m_{c,N}^* 2^{\wedge c},$$

and $m_{c,N}$ represents a reserved segment quantity that corresponds to N and that is of segments whose segment code lengths are $2^{\wedge c}$.

Optionally, the segment quantity determining unit 803 includes a remaining segment quantity determining unit 803 and a segment quantity determining subunit 803.

The remaining segment quantity determining unit 803 is configured to orderly determine a remaining segment quantity of each type of segments based on N, the reserved code length, and the segment code length of each type of segments and based on the segment code lengths from the largest to the smallest, where the remaining segment quantity of each type of segments is a remaining segment quantity of each type of segments corresponding to a remaining code length that is obtained by subtracting the reserved code length from N.

The segment quantity determining subunit 803 is configured to determine the segment quantity of each type of segments based on the reserved segment quantity of each type of segments and the remaining segment quantity of each type of segments.

Optionally, the remaining segment quantity determining unit 803 is configured to if $N<2^{\wedge a}$, determine that a remaining segment quantity $z_{c,N}$ that corresponds to N and that is of the segments whose segment code lengths are $2^{\wedge c}$ is 0, and a remaining segment quantity $z_{a,N}$ that corresponds to N and that is of the segments whose segment code lengths are $2^{\wedge a}$ is 1, where $a<c\leq b$; or if $N\geq 2^{\wedge a}$, orderly determine the remaining segment quantity of each type of segments based on the segment code lengths from the largest to the smallest, and determine that a remaining segment quantity $z_{b,N}$ that corresponds to N and that is of segments whose segment code lengths are $2^{\wedge b}$ is $$\mathrm{floor}\left(\frac{N-N_{res}}{2^{\wedge b}}\right),$$

and a remaining segment quantity $z_{c,N}$ that corresponds to N and that is of the segments whose segment code lengths are $2^{\wedge c}$ is $$\mathrm{floor}\left(\frac{N-N_{res}-\sum_{e=c+1}^{b}z_{e,N}*2^{\wedge e}}{2^{\wedge c}}\right),$$

where $a\leq c<b$, and floor(x) represents rounding down x.

Optionally, the segment quantity determining subunit 803 is configured to determine a segment quantity $M_{c,N}$ that corresponds to N and that is of the segments whose segment code lengths are $2^{\wedge c}$, where $M_{c,N}=m_{c,N}+z_{c,N}$, and $a\leq c\leq b$.

Optionally, the information bit length determining unit 804 is specifically configured to: determine that a target information bit length of a segment whose segment code length is $2^{\wedge c}$ in the S segments is ceil($2^{\wedge c}*R$).

Optionally, the information bit length determining unit 804 is configured to if $$\sum_{c=a}^{b}M_{c,N}*\mathrm{ceil}(2^{\wedge c}*R)=K_0,$$

determine that a target information bit length of a segment whose segment code length is $2^{\wedge c}$ is ceil($2^{\wedge c}*R$), where $a\leq c\leq b$; or if $$\sum_{c=a}^{b}M_{c,N}*\mathrm{ceil}(2^{\wedge c}*R)>K_0,$$

determine that a target information bit length of a segment whose segment code length is $2^{\wedge c}$ is ceil($2^{\wedge c}*R$), target information bit lengths that correspond to N and that are of the first $M_{a,N}-1$ segments in $M_{a,N}$ segments whose segment code lengths are $2^{\wedge a}$ are ceil($2^{\wedge a}*R$), and a target information bit length of an $(M_{a,N})^{th}$ segment is $$K_0-\sum_{c=a+1}^{b}M_{c,N}*\mathrm{ceil}(2^{\wedge c}*R)+(M_{a,N}-1)*\mathrm{ceil}(2^{\wedge a}*R),$$

where the $(M_{a,N})^{th}$ segment is an $S^{th}$ segment in the S segments, and $a<c\leq b$.

Optionally, the information bit length determining unit 804 includes a reference information bit length determining unit 804 and a target information bit length determining unit 804.

The reference information bit length determining unit 804 is configured to determine a reference information bit length of each segment.

The target information bit length determining unit 804 is configured to determine the target information bit length of each segment based on the reference information bit length of each segment and the segment quantity of each type of segments.

Optionally, the reference information bit length determining unit 804 is configured to if $$\sum_{c=a}^{b}M_{c,N}*\mathrm{ceil}(2^{\wedge c}*R)=K_0,$$

determine that a reference information bit length that corresponds to N and that is of a segment whose segment code length is $2^{\wedge c}$ is ceil($2^{\wedge c}*R$), where $a\leq c\leq b$; or if $$\sum_{c=a}^{b}M_{c,N}*\mathrm{ceil}(2^{\wedge c}*R)>K_0,$$

determine that a reference information bit length that corresponds to N and that is of a segment whose segment code length is $2^{\wedge c}$ is ceil($2^{\wedge c}*R$), reference information bit lengths of the first $M_{a,N}-1$ segments in $M_{a,N}$ segments are ceil($2^{\wedge a}*R$), and a reference information bit length of an $(M_{a,N})^{th}$ segment in the $M_{a,N}$ segments is $$K_0-\sum_{c=a+1}^{b}M_{c,N}*\mathrm{ceil}(2^{\wedge c}*R)+(M_{a,N}-1)*\mathrm{ceil}(2^{\wedge a}*R),$$

where the $(M_{a,N})^{th}$ segment is an $S^{th}$ segment in the S segments, and $a<c\leq b$.

Optionally, the reference information bit length of the segment whose segment code length is $2^{\wedge c}$ in the S segments is ceil($2^{\wedge c}*R$).

Optionally, the target information bit length determining unit 804 is configured to determine the target information bit length of each segment according to an allocation principle. The allocation principle is that on the basis of the reference information bit length of each segment, a first information bit length is added to f segments whose segment code lengths are the largest in the S segments, h segments whose segment code lengths are not the largest in the S segments are reduced by the first information bit length, a segment code rate of a $(j+1)^{th}$ segment in the h segments is less than or equal to a segment code rate of a $j^{th}$ segment in the h segments, a segment code length of the $(j+1)^{th}$ segment is less than or equal to a segment code length of the $j^{th}$ segment, and a sum of target information bit lengths of the S segments is $K_0$, where f and h are positive integers, and a segment code rate of a segment equal to a target information bit length of the segment or a segment code length of the segment.

Optionally, the target information bit length determining unit 804 is configured to determine a target information bit length of a first segment, where the target information bit length of the first segment is equal to a reference information bit length of the first segment plus a second information bit length, and the first segment is a segment whose segment code length is the largest in the S segments; and determine a target information bit length of a second segment, where the target information bit length of the second segment is equal to a reference information bit length of the second segment minus a third information bit length, and the second segment is a segment whose segment code length is not the largest in the S segments. In the S segments, h segments whose segment code lengths are not the largest are reduced by f times of the second information bit length, where a segment code rate of a $(j+1)^{th}$ segment in the h segments is less than or equal to a segment code rate of a $j^{th}$ segment in the h segments, a segment code length of the $(j+1)^{th}$ segment is less than or equal to a segment code length of the $j^{th}$ segment, a sum of target information bit lengths of the S segments is $K_0$, f is a segment quantity of segments whose segment code lengths are the largest in the S segments, and h is a positive integer greater than or equal to 0.

Optionally, the target information bit length determining unit 804 is configured to if a segment code length of a segment whose segment code length is the largest in the S segments is $2^{\wedge a}$, determine that a target information bit length of the segment whose segment code length is $2^{\wedge a}$ is equal to a reference information bit length of the segment whose segment code length is $2^{\wedge a}$; or if a segment code length of a segment whose segment code length is the largest in the S segments is $2^{\wedge r}$, determine that a target information bit length of the segment whose segment code length is $2^{\wedge r}$ is a reference information bit length of the segment whose segment code length is $2^{\wedge r}$ plus $$\sum_{c=a}^{r-1} \partial_c * M_{c,N},$$

and a target information bit length of a segment whose segment code length is $2^{\wedge c}$ is a reference information bit length of the segment whose segment code length is $2^{\wedge c}$ minus $\partial_c * M_{r,N}$, where $a \le c < r$, $\partial_c$ is a proportion parameter, and $\partial_c$ is a positive integer.

Optionally, $0 < \partial_{c+1} \le 2\partial_c$.

Optionally, if $M_{b,N} > T$, and T is a positive integer, the target information bit length determining unit 804 is configured to determine that target information bit lengths of the first T segments in $M_{b,N}$ segments whose segment code lengths are $2^{\wedge b}$ are a reference information bit length of the segment whose segment code length is $2^{\wedge b}$ plus $$\sum_{c=a}^{b-1} \partial_c * M_{c,N},$$

target information bit lengths of the last $M_{b,N} - T$ segments in the $M_{b,N}$ segments are equal to the reference information bit length of the segment whose segment code length is $2^{\wedge b}$, and a target information bit length of a segment whose segment code length is $2^{\wedge c}$ is a reference information bit length of the segment whose segment code length is $2^{\wedge c}$ minus $\partial_c * T$, where $a \le c < b$, $\partial_c$ is a positive integer, and $\partial_{c+1} > \partial_c$.

Optionally, the encoding unit 805 is configured to orderly allocate the to-be-encoded information bits to the S segments based on the target information bit length of each segment, and perform polar code encoding on information bits of each segment.

Optionally, the encoding unit 805 is configured to if $$\sum_{c=a}^{b} M_{c,N} * \text{ceil}(2^{\wedge c} * R) = K_0,$$

orderly allocate the to-be-encoded information bits to the S segments based on the target information bit length of each segment, and perform polar code encoding on information bits of each segment; or if $$\sum_{c=a}^{b} M_{c,N} * \text{ceil}(2^{\wedge c} * R) > K_0,$$

perform zero-padding on to-be-encoded information bits whose information bit length is $K_0$, where the information bit length of the to-be-encoded information bits after zero-padding is $$\sum_{c=a}^{b} M_{c,N} * \text{ceil}(2^{\wedge c} * R),$$

orderly allocate the to-be-encoded information bits after zero-padding to the S segments based on the target information bit length of each segment, and perform polar code encoding on information bits of each segment.

An embodiment further provides a chip system 900, including one or more processors 901 and an interface circuit 902. The processor 901 is connected to the interface circuit 902.

The processor 901 may be an integrated circuit chip and has a signal processing capability. In an implementation process, steps in the foregoing methods can be implemented by a hardware integrated logical circuit in the processor 901, or by instructions in a form of software. The processor 901 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 901 may implement or perform the methods and steps that are disclosed in the embodiments. The general-purpose processor may be a microprocessor, any processor, or the like.

The interface circuit 902 may send or receive data, instructions, or information. The processor 901 may process data, instructions, or other information received through the interface circuit 902, and send, through the interface circuit 902, information obtained after processing.

Optionally, the chip system further includes a memory 903. The memory 903 may include a read-only memory (ROM) and a RAM, and provide operation instructions and data for the processor. A part of the memory 903 may further include a non-volatile random access memory (NVRAM).

Optionally, the memory 903 stores an executable software module or a data structure, and the processor 903 may perform a corresponding operation by invoking an operation instruction stored in the memory (where the operation instruction may be stored in an operating system).

Optionally, the chip system may be used in the terminal device or the Bluetooth headset related to the embodiments.

An embodiment further provides a computer-readable storage medium. The method described in the foregoing method embodiments may be all or partially implemented by using software, hardware, firmware, or any combination thereof. If implemented in software, the function may be stored as one or more instructions or code on the computer-readable medium or transmitted on a computer-readable medium. The computer-readable medium may include a computer storage medium and a communication medium, and may further include any medium capable of transferring a computer program from one place to another. The storage medium may be any available medium accessible to a computer.

In an optional design, the computer-readable medium may include a RAM, a ROM, an electrically erasable programmable ROM (EEPROM), a compact disc ROM (CD-ROM) or another optical disc memory, a magnetic disk memory or another magnetic storage device, or any other medium that may be used for carrying or required program code is stored in a form of an instruction or a data structure, and is accessible to a computer. In addition, any connection may be appropriately referred to as a computer-readable medium. For example, if software is transmitted from a website, a server, or another remote source by using a coaxial cable, a fiber optical cable, a twisted pair, a digital subscriber line (DSL), or wireless technologies (for example, infrared ray, radio, and microwave), the coaxial cable, the fiber optical cable, the twisted pair, the DSL, or the wireless technologies such as infrared ray, radio and microwave are included in the definition of a medium. Disks and discs as used herein include optical discs (CDs), laser discs, optical discs, digital versatile discs (DVDs), floppy disks, and Blu-ray discs, where disks may reproduce data magnetically, and discs reproduce data optically using lasers. The combination described above may be in the scope of the computer-readable medium.

An embodiment further provides a computer program product. The method described in the foregoing method embodiments may be all or partially implemented by using software, hardware, firmware, or any combination thereof. If implemented in software, it may be implemented completely or partially in the form of a computer program product. The computer program product includes one or more computer instructions. When the foregoing computer program instructions are loaded and executed on the computer, the procedure or functions described according to the foregoing method embodiments are all or partially generated. The foregoing computer may be a general-purpose computer, a dedicated computer, a computer network, a network device, a user device, or other programmable apparatuses.

In conclusion, the foregoing embodiments are merely intended for describing technical solutions, but not for limiting this disclosure. Although this disclosure describes the foregoing embodiments, a person of ordinary skill in the art should understand that modifications to the technical solutions recorded in the foregoing embodiments or equivalent replacements to some technical features thereof may still be made, without departing from the scope of the technical solutions of the embodiments of this disclosure.

What is claimed is:

1. A polar code segment encoding method, comprising:
   determining, based on a length of to-be-encoded information bits and a code rate, a code length N after encoding the to-be-encoded information bits, wherein N is a positive integer;
   determining, based on N, a minimum segment code length, a maximum segment code length, a reserved segment quantity of each type of segments in segments of b−a+1 types of segment code lengths and a reserved code length corresponding to N, wherein a value of the minimum segment code length is $2^a$, a value of the maximum segment code length is $2^b$, the b−a+1 types of segment code lengths of the segments are $2^c$, a, b, and c are positive integers, a<b, and a≤c≤b;
   determining a segment quantity of each type of segments based on N, the reserved code length, a segment code length of each type of segments, the reserved segment quantity of each type of segments and the segment code lengths from a largest to a smallest, wherein a sum of segment quantities of all types of segments is equal to S, N corresponds to S segments, and a first segment code length of an $i^{th}$ segment in the S segments is greater than or equal to a second segment code length of an $(i+1)^{th}$ segment in the S segments;
   determining a target information bit length of each segment based on the code rate and the segment code length of each segment in the S segments; and
   performing polar code encoding on the to-be-encoded information bits based on the target information bit length of each segment.

2. The method according to claim 1, wherein determining, based on the length of to-be-encoded information bits and the code rate, the code length N after encoding comprises:
   determining a theoretical code length L based on the length of the to-be-encoded information bits ($K_0$) and the code rate (R), wherein a value of the theoretical code length is ceil($K_0$/R), and ceil(x) represents rounding up x; and
   determining N based on the theoretical code length and the minimum segment code length ($2^a$), wherein a value of N is ceil(L/$2^a$)*$2^a$.

3. The method according to claim 1, wherein determining, based on N, the minimum segment code length, the maximum segment code length, the reserved segment quantity of each type of segments in the segments of b−a+1 types of segment code lengths and the reserved code length corresponding to N comprises:
   determining the segments of the b−a+1 types of segment code lengths based on the minimum segment code length and the maximum segment code length;
   determining a first reserved segment quantity of an $i^{th}$ type of segments in the b−a+1 types of segments based on the b−a+1 types of segment code lengths of the segments from the smallest to the largest and based on N and first segment code length of each type of segments in the b−a+1 types of segments, wherein the first reserved segment quantity of the $i^{th}$ type of segments is greater than or equal to a second reserved segment quantity of an $(i+1)^{th}$ type of segments in the b−a+1 types of segments; and determining the reserved code length corresponding to N based on the reserved segment quantity of each type of segments and the segment code length of each type of segments.

4. The method according to claim 1, wherein determining, based on N, the minimum segment code length, the maximum segment code length, the reserved segment quantity of each type of segments in the segments of b−a+1 types of segment code lengths and the reserved code length corresponding to N comprises:

determining, when $N<p*2^{\wedge a}$, that a first reserved segment quantity that corresponds to N and that is of segments whose segment code lengths are $2^{\wedge a}$ is $$\text{floor}\left(\frac{N}{2^{\wedge a}}\right),$$

and a second reserved segment quantity that corresponds to N and that is of segments whose segment code lengths are $2^{\wedge j}$ is 0, wherein a<j≤b, and p≥2;

determining, when $$p*\sum_{i=a}^{c}2^{\wedge i} \leq N < p*\sum_{i=a}^{c+1}2^{\wedge i},$$

that a third reserved segment quantity that corresponds to N and that is of segments whose segment code lengths are $2^{\wedge j}$ is 0, a fourth reserved segment quantity that corresponds to N and that is of segments whose segment code lengths are $2^{\wedge c+1}$ is $$\text{floor}\left(\frac{N-p*\sum_{i=a}^{c}2^{\wedge i}}{2^{\wedge c+1}}\right),$$

and a fifth reserved segment quantity that corresponds to N and that is of segments whose segment code lengths are $2^{\wedge v}$ is p, wherein a≤c≤b−1, a≤v≤c, and c+1<j≤b; or determining, when $$p*\sum_{i=a}^{b}2^{\wedge i} \leq N,$$

that the reserved segment quantity of each type of segments is p; and determining a first reserved code length $N_{res}$ based on the reserved segment quantity of each type of segments, wherein $$N_{res} = \sum_{c=a}^{b}m_{c,N}*2^{\wedge c},$$

and $m_{c,N}$ represents the reserved segment quantity that corresponds to N and that is of segments whose segment code lengths are $2^{\wedge c}$.

5. The method according to claim 1, wherein the determining, based on N, the minimum segment code length, the maximum segment code length, the reserved segment quantity of each type of segments in segments of b−a+1 types of segment code lengths and the reserved code length corresponding to N comprises:

determining, when $N<2^{\wedge a}$, that the reserved segment quantity of each type of segments is 0;

determining, when $$\sum_{i=a}^{c}2^{\wedge i} \leq N < \sum_{i=a}^{c+1}2^{\wedge i},$$

that a first reserved segment quantity that corresponds to N and that is of segments whose segment code lengths are $2^{\wedge j}$ is 0, and a second reserved segment quantity that corresponds to N and that is of segments whose segment code lengths are $2^{\wedge v}$ is 1, wherein a≤c≤b−1, a≤v≤c, and c<j≤b; or determining, when $$\sum_{i=a}^{b}2^{\wedge i} \leq N,$$

that the reserved segment quantity of each type of segments is 1; and determining a first reserved code length $N_{res}$ based on the reserved segment quantity of each type of segments, wherein $$N_{res} = \sum_{c=a}^{b}m_{c,N}*2^{\wedge c},$$

and $m_{c,N}$ represents the reserved segment quantity that corresponds to N and that is of segments whose segment code lengths are $2^{\wedge c}$.

6. The method according to claim 1, wherein determining the segment quantity of each type of segments based on N, the reserved code length, the segment code length of each type of segments, the reserved segment quantity of each type of segments and the segment code lengths from the largest to the smallest comprises:

determining a remaining segment quantity of each type of segments based on N, the reserved code length, the segment code length of each type of segments and the segment code lengths from the largest to the smallest, wherein the remaining segment quantity of each type of segments is a first remaining segment quantity of each type of segments corresponding to a remaining code length that is obtained by subtracting the reserved code length from N; and determining the segment quantity of each type of segments based on the reserved segment quantity of each type of segments and the remaining segment quantity of each type of segments.

7. The method according to claim 6, wherein determining the remaining segment quantity of each type of segments based on N, the reserved code length, the segment code length of each type of segments and the segment code lengths from the largest to the smallest comprises:

determining, when $N<2^{\wedge a}$, that a second remaining segment quantity $z_{c,N}$ that corresponds to N and that is of the segments whose segment code lengths are $2^{\wedge c}$ is 0, and a third remaining segment quantity $z_{a,N}$ that corresponds to N and that is of the segments whose segment code lengths are $2^{\wedge a}$ is 1, wherein $a<c\leq b$; or determining, when $N\geq 2^{\wedge a}$, the remaining segment quantity of each type of segments based on the segment code lengths from the largest to the smallest, and determining that a second remaining segment quantity $z_{b,N}$ that corresponds to N and that is of segments whose segment code lengths are $2^{\wedge b}$ is $$\text{floor}\left(\frac{N - N_{res}}{2^{\wedge b}}\right),$$

and a third remaining segment quantity $z_{c,N}$ that corresponds to N and that is of the segments whose segment code lengths are $2^{\wedge c}$ is $$\text{floor}\left(\frac{N - N_{res} - \sum_{e=c+1}^{b} z_{e,N}*2^{\wedge e}}{2^{\wedge c}}\right),$$

wherein $a\leq c<b$, and floor(x) represents rounding down x, wherein $N_{res}$ is a first reserved code length.

8. The method according to claim 7, wherein determining the segment quantity of each type of segments based on the reserved segment quantity of each type of segments and the remaining segment quantity of each type of segments comprises determining a first segment quantity $M_{c,N}$ that corresponds to N and that is of the segments whose segment code lengths are $2^{\wedge c}$, wherein $M_{c,N}=m_{c,N}+z_{c,N}$, $a\leq c\leq b$, and c is a positive integer.

9. The method according to claim 1, wherein the determining the target information bit length of each segment based on the code rate (R) and the segment code length of each segment in the S segments comprises determining that a first target information bit length of a segment whose segment code length is $2^{\wedge c}$ in the S segments is ceil($2^{\wedge c}*R$).

10. The method according to claim 1, wherein the determining the target information bit length of each segment based on the code rate and the segment code length of each segment in the S segments comprises:
determining a reference information bit length of each segment; and
determining the target information bit length of each segment based on the reference information bit length of each segment and the segment quantity of each type of segments.

11. The method according to claim 10, wherein determining the target information bit length of each segment based on the reference information bit length of each segment and the segment quantity of each type of segments comprises determining the target information bit length of each segment according to an allocation principle, wherein the allocation principle is that on a basis of the reference information bit length of each segment, a first information bit length is added to f segments whose segment code lengths are largest in the S segments, h segments whose segment code lengths are not the largest in the S segments are reduced by the first information bit length, a segment code rate of a $(j+1)^{th}$ segment in the h segments is less than or equal to a segment code rate of a $j^{th}$ segment in the h segments, a first segment code length of the $(j+1)^{th}$ segment is less than or equal to a second segment code length of the $j^{th}$ segment, and a sum of target information bit lengths of the S segments is $K_0$, wherein f and h are positive integers.

12. A communication device, comprising:
a code length determining processor configured to determine, based on a length of to-be-encoded information bits and a code rate, a code length N after encoding, wherein N is a positive integer;
a reservation processor configured to determine, based on N, a minimum segment code length, a maximum segment code length, a reserved segment quantity of each type of segments in segments of b−a+1 types of segment code lengths and a reserved code length corresponding to N, wherein a value of the minimum segment code length is $2^{\wedge a}$, a value of the maximum segment code length is $2^{\wedge b}$, the b−a+1 types of segment code lengths of the segments are $2^{\wedge c}$, a, b, and c are positive integers, $a<b$, and $a\leq c\leq b$;
a segment quantity determining processor configured to determine a segment quantity of each type of segments based on N, the reserved code length, a segment code length of each type of segments, the reserved segment quantity of each type of segments and the segment code lengths from a largest to a smallest, wherein a sum of segment quantities of all types of segments is equal to S, N corresponds to S segments, and a first segment code length of an $i^{th}$ segment in the S segments is greater than or equal to a second segment code length of an $(i+1)^{th}$ segment in the S segments;
an information bit length determining processor configured to determine a target information bit length of each segment based on the code rate and the segment code length of each segment in the S segments; and
an encoding processor configured to perform polar code encoding on the to-be-encoded information bits based on the target information bit length of each segment.

13. The communication device according to claim 12, wherein the code length determining processor is configured to:
determine a theoretical code length L based on the length of the to-be-encoded information bits ($K_0$) and the code rate (R), wherein a value of the theoretical code length is ceil($K_0/R$), and ceil(x) represents rounding up x; and
determine N based on the theoretical code length and the minimum segment code length $2^{\wedge a}$, wherein a value of N is ceil($L/2^{\wedge a}$)*$2^{\wedge a}$.

14. The communication device according to claim 12, wherein the reservation processor is configured to:
determine the segments of the b−a+1 types of segment code lengths based on the minimum segment code length and the maximum segment code length;
determine a first reserved segment quantity of an $i^{th}$ type of segments in the b−a+1 types of segments based on the b−a+1 types of segment code lengths of the segments from the smallest to the largest and based on N and the segment code length of each type of segments in the b−a+1 types of segments, wherein the first reserved segment quantity of the $i^{th}$ type of segments is greater than or equal to a second reserved segment quantity of an $(i+1)^{th}$ type of segments in the b−a+1 types of segments; and determine the reserved code length corresponding to N based on the reserved segment quantity of each type of segments and the segment code length of each type of segments.

15. The communication device according to claim 12, wherein the reservation processor is configured to:

when $N<p*2^{\wedge a}$, determine that a first reserved segment quantity that corresponds to N and that is of segments whose segment code lengths are $2^{\wedge a}$ is $$\text{floor}\left(\frac{N}{2^{\wedge a}}\right),$$

and a second reserved segment quantity that corresponds to N and that is of segments whose segment code lengths are $2^{\wedge j}$ is 0, wherein $a<j\leq b$, and $p\geq 2$;

when $p*\Sigma_{i-a}^{c}2^{\wedge i}\leq N<p*\Sigma_{i-a}^{c+1}2^{\wedge i}$, determine that a third reserved segment quantity that corresponds to N and that is of segments whose segment code lengths are $2^{\wedge j}$ is 0, a fourth reserved segment quantity that corresponds to N and that is of segments whose segment code lengths are $2^{\wedge c+1}$ is $$\text{floor}\left(\frac{N-p^*\sum_{i=a}^{c}2^{\wedge i}}{2^{\wedge c+1}}\right),$$

and a fifth reserved segment quantity that corresponds to N and that is of segments whose segment code lengths are $2^{\wedge v}$ is p, wherein $a\leq c\leq b-1$, $a\leq v\leq c$, and $c+1<j\leq b$; or when $p*\Sigma_{i-a}^{b}2^{\wedge i}\leq N$, determine that the reserved segment quantity of each type of segments is p; and determine a first reserved code length $N_{res}$ based on the reserved segment quantity of each type of segments, wherein $$N_{res} = \sum_{c=a}^{b}m_{c,N}*2^{\wedge c},$$

and $m_{c,N}$ represents the reserved segment quantity that corresponds to N and that is of segments whose segment code lengths are $2^{\wedge c}$.

16. The communication device according to claim 12, wherein the reservation processor is configured to:

when $N<2^{\wedge a}$, determine that the reserved segment quantity of each type of segments is 0;

when $$\sum_{i=a}^{c}2^{\wedge i} \leq N < \sum_{i=a}^{c+1}2^{\wedge i},$$

determine that a first reserved segment quantity that corresponds to N and that is of segments whose segment code lengths are $2^{\wedge j}$ is 0, and a second reserved segment quantity that corresponds to N and that is of segments whose segment code lengths are $2^{\wedge v}$ is 1, wherein $a\leq c\leq b-1$, $a\leq v\leq c$, and $c<j\leq b$; or when $$\sum_{i=a}^{b}2^{\wedge i} \leq N,$$

determine that the reserved segment quantity of each type of segments is 1; and determine a first reserved code length $N_{res}$ based on the reserved segment quantity of each type of segments, wherein $$N_{res} = \sum_{c=a}^{b}m_{c,N}*2^{\wedge c},$$

and $m_{c,N}$ represents the reserved segment quantity that corresponds to N and that is of segments whose segment code lengths are $2^{\wedge c}$.

17. The communication device according to claim 12, wherein the segment quantity determining processor comprises:

a remaining segment quantity determining processor configured to determine a remaining segment quantity of each type of segments based on N, the reserved code length, the segment code length of each type of segments and the segment code lengths from the largest to the smallest, wherein the remaining segment quantity of each type of segments is a first remaining segment quantity of each type of segments corresponding to a remaining code length that is obtained by subtracting the reserved code length from N; and a second segment quantity determining processor; configured to determine the segment quantity of each type of segments based on the reserved segment quantity of each type of segments and the remaining segment quantity of each type of segments.

18. The communication device according to claim 17, wherein the remaining segment quantity determining processor is configured to:

when $N<2^{\wedge a}$, determine that a second remaining segment quantity $z_{c,N}$ that corresponds to N and that is of the segments whose segment code lengths are $2^{\wedge c}$ is 0, and a third remaining segment quantity $z_{a,N}$ that corresponds to N and that is of the segments whose segment code lengths are $2^{\wedge a}$ is 1, wherein $a<c\leq b$; or when $N\geq 2^{\wedge a}$, determine the remaining segment quantity of each type of segments based on the segment code lengths from the largest to the smallest, and determine that a second remaining segment quantity $z_{b,N}$ that corresponds to N and that is of segments whose segment code lengths are $2^{\wedge b}$ is $$\text{floor}\left(\frac{N-N_{res}}{2^{\wedge b}}\right),$$

and a third remaining segment quantity $z_{c,N}$ that corresponds to N and that is of the segments whose segment code lengths are $2^{\wedge c}$ is $$\text{floor}\left(\frac{N-N_{res}-\sum_{e=c+1}^{b}z_{e,N}*2^{\wedge e}}{2^{\wedge c}}\right),$$

wherein a≤c<b, and floor(x) represents rounding down x, wherein $N_{res}$ is a first reserved code length.

19. The communication device according to claim 18, wherein the second segment quantity determining processor is configured to:
   determine a first segment quantity $M_{c,N}$ that corresponds to N and that is of the segments whose segment code lengths are $2^c$, wherein $M_{c,N}=m_{c,N}+z_{c,N}$, and a≤c≤b.

20. A communication device, comprising:
   a memory configured to store instructions; and
   a processor coupled to the memory, wherein when executed by the processor, the instructions cause the communication device to:
      determine, based on a length of to-be-encoded information bits and a code rate, a code length N after encoding, wherein N is a positive integer;
      determine, based on N, a minimum segment code length, a maximum segment code length, a reserved segment quantity of each type of segments in segments of b−a+1 types of segment code lengths and a reserved code length corresponding to N, wherein a value of the minimum segment code length is $2^a$, a value of the maximum segment code length is $2^b$, the b−a+1 types of segment code lengths of the segments are $2^c$, a, b, and c are positive integers, a<b, and a≤c≤b;
      determine a segment quantity of each type of segments based on N, the reserved code length, a segment code length of each type of segments, the reserved segment quantity of each type of segments and the segment code lengths from a largest to a smallest, wherein a sum of segment quantities of all types of segments is equal to S, N corresponds to S segments, and a first segment code length of an $i^{th}$ segment in the S segments is greater than or equal to a second segment code length of an $(i+1)^{th}$ segment in the S segments;
      determine a target information bit length of each segment based on the code rate and the segment code length of each segment in the S segments; and
      perform polar code encoding on the to-be-encoded information bits based on the target information bit length of each segment.

* * * * *

UNITED STATES PATENT AND TRADEMARK OFFICE
CERTIFICATE OF CORRECTION

PATENT NO. : 11,888,614 B2
APPLICATION NO. : 17/704869
DATED : January 30, 2024
INVENTOR(S) : Shengchen Dai et al.

It is certified that error appears in the above-identified patent and that said Letters Patent is hereby corrected as shown below:

In the Claims

Claim 15, Column 49, Line 18: "code lengths are $2^{\wedge}j$ is 0, wherein $a<j\leq$; b, and $p\geq 2$;" should read "code lengths are $2^{\wedge}j$ is 0, wherein $a<j\leq b$, and $p\geq 2$;"

Signed and Sealed this
Second Day of April, 2024

Katherine Kelly Vidal
*Director of the United States Patent and Trademark Office*